(12) United States Patent
Jeon et al.

(10) Patent No.: US 11,623,173 B2
(45) Date of Patent: Apr. 11, 2023

(54) AIR PURIFIER, AIR PURIFYING SYSTEM, AND METHOD OF CONTROLLING AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jongkeon Jeon, Seoul (KR); Haeyoong Chung, Seoul (KR); Jiyoung Kang, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 575 days.

(21) Appl. No.: 16/821,124

(22) Filed: Mar. 17, 2020

(65) Prior Publication Data

US 2020/0298162 A1    Sep. 24, 2020

(30) Foreign Application Priority Data

Mar. 19, 2019   (KR) .................. 10-2019-0031481
Jul. 29, 2019   (KR) .................. 10-2019-0091553

(51) Int. Cl.
*B01D 46/00*    (2022.01)
*B01D 46/10*    (2006.01)
(Continued)

(52) U.S. Cl.
CPC ......... *B01D 46/76* (2022.01); *B01D 46/0013* (2013.01); *B01D 46/10* (2013.01);
(Continued)

(58) Field of Classification Search
CPC .. B01D 46/76; B01D 46/4227; B01D 46/429; B01D 2221/08; B01D 2283/30;
(Continued)

(56) References Cited

U.S. PATENT DOCUMENTS 4,832,716 A    5/1989  McMichael
5,524,321 A *  6/1996  Weaver ................ A47L 9/2857
                                              15/327.5
(Continued)

FOREIGN PATENT DOCUMENTS

CA    2 087 056    7/1994
CN    2124670      12/1992
(Continued)

OTHER PUBLICATIONS

Chinese Office Action dated Mar. 24, 2021 issued in Application No. 202010191311.6.
(Continued)

*Primary Examiner* — Minh Chau T Pham
(74) *Attorney, Agent, or Firm* — KED & Associates, LLP

(57) ABSTRACT

A handheld air purifier may include a suction body provided with a fan to suction air and a filter to filter foreign matter from the sucked air, a handle extending from the suction body, and an agitator provided in the suction body to loosen or scatter dust from a garment. The handheld air purifier may be configured to be attached to and detached from a main air purifier, and the main air purifier may suction dust off the handheld air purifier and sterilize the handheld air purifier when the handheld air purifier is mounted on the main air purifier. The agitator of the handheld air purifier may have a striking member exposed through a lower surface of the suction body, and may move out of and into the suction body to strike the garment so that the dust may be loosened and suctioned into the suction body and filtered by the filter.

19 Claims, 20 Drawing Sheets

(51) Int. Cl.
*B01D 46/42* (2006.01)
*A47L 9/00* (2006.01)
*A47L 9/04* (2006.01)
*B01D 46/76* (2022.01)

(52) U.S. Cl.
CPC ....... *B01D 46/429* (2013.01); *B01D 46/4227* (2013.01); *B01D 2221/02* (2013.01); *B01D 2221/08* (2013.01); *B01D 2273/30* (2013.01)

(58) Field of Classification Search
CPC ...... F24F 8/158; A47L 9/0093; A47L 9/0472; A47L 9/0483; A47L 9/2857; A47L 8/10; A47L 5/365; A47L 5/26
See application file for complete search history.

(56) References Cited

U.S. PATENT DOCUMENTS

| | | | | |
|---|---|---|---|---|
| 5,803,940 | A | * | 9/1998 | Rick ........................ F24F 8/158 55/467 |
| 6,660,070 | B2 | | 12/2003 | Chung |
| 8,302,251 | B2 | | 11/2012 | Beskow et al. |
| 10,323,855 | B2 | | 6/2019 | Jung |
| 10,563,667 | B2 | | 2/2020 | Park |
| 10,695,706 | B2 | | 6/2020 | Cho |
| 10,697,665 | B2 | | 6/2020 | Jung |
| 2004/0200007 | A1 | | 10/2004 | Heim |
| 2007/0221061 | A1 | * | 9/2007 | Steiner ...................... F24F 8/10 55/467 |
| 2008/0300154 | A1 | | 12/2008 | Duchesne et al. |
| 2009/0007368 | A1 | * | 1/2009 | Oh ......................... A47L 9/0472 15/339 |
| 2009/0248208 | A1 | | 10/2009 | Fukushima et al. |
| 2010/0242209 | A1 | | 9/2010 | Beskow et al. |
| 2011/0083757 | A1 | | 4/2011 | Shore |
| 2011/0083767 | A1 | * | 4/2011 | Johnson .................. C30B 33/02 140/71 R |
| 2018/0211168 | A1 | | 7/2018 | Khurshudov |
| 2019/0274509 | A1 | * | 9/2019 | Moyher, Jr. ............. A47L 5/365 |
| 2022/0061621 | A1 | | 3/2022 | Weyant |
| 2022/0142435 | A1 | * | 5/2022 | Moyher, Jr. ........... A47L 9/0045 |

FOREIGN PATENT DOCUMENTS

| | | |
|---|---|---|
| CN | 1091183 | 8/1994 |
| CN | 1636494 | 7/2005 |
| CN | 1718272 | 1/2006 |
| CN | 1922352 | 2/2007 |
| CN | 101182674 | 5/2008 |
| CN | 201337394 | 11/2009 |
| CN | 201482748 | 5/2010 |
| CN | 201615550 | 10/2010 |
| CN | 201624612 | 11/2010 |
| CN | 103479296 | 1/2014 |
| CN | 203852751 | 10/2014 |
| CN | 104159384 | 11/2014 |
| CN | 104832996 | 8/2015 |
| CN | 105202646 | 12/2015 |
| CN | 105465918 | 4/2016 |
| CN | 105674417 | 6/2016 |
| CN | 105 962 842 | 9/2016 |
| CN | 206138051 | 5/2017 |
| CN | 106958873 | 7/2017 |
| CN | 206347659 | 7/2017 |
| CN | 107019483 | 8/2017 |
| CN | 107110530 | 8/2017 |
| CN | 207821786 | 9/2018 |
| CN | 108937823 | 12/2018 |
| CN | 208355430 | 1/2019 |
| CN | 109442619 | 3/2019 |
| CN | 110857807 | 3/2020 |
| CN | 111473459 | 7/2020 |
| CN | 111720915 | 9/2020 |
| DE | 10-2017-206356 | 10/2018 |
| EP | 3211338 | 8/2017 |
| EP | 3237809 | 11/2017 |
| JP | 08-187660 | 7/1996 |
| JP | H08-187660 | 7/1996 |
| JP | 11-267416 | 10/1999 |
| JP | H11-267416 | 10/1999 |
| JP | 2002-292226 | 10/2002 |
| JP | 3129636 | 3/2007 |
| JP | 2017-40448 | 2/2017 |
| KR | 10-2006-0089191 | 8/2006 |
| KR | 10-2016-0147301 | 12/2016 |
| KR | 10-2017-0019895 | 2/2017 |
| KR | 10-2018-0052794 | 5/2018 |

OTHER PUBLICATIONS

Chinese Office Action dated Mar. 22, 2021 issued in Application No. 202010190698.3.
Chinese Office Action dated Sep. 10, 2021 issued in Application No. 202010190698.3.
European Search Report dated Aug. 20, 2020 issued in Application No. 20161002.9.
Chinese Notice of Allowance dated Apr. 13, 2022 issued in Application No. 202010190698.3.
U.S. Office Action dated Jul. 11, 2022 issued in U.S. Appl. No. 16/821,197.
Chinese Notice of Allowance dated Apr. 13, 2022 issued in CN Application No. 202010190698.3.
Chinese Office Action issued in Application No. 202010191311.6 dated Jan. 13, 2022.
European Search Report dated Aug. 20, 2020 issued in Application No. 20160853.6.
European Search Report dated Aug. 14, 2020 issued in Application No. 20160997.1.
U.S. Office Action issued in U.S. Appl. No. 16/821,087 dated Sep. 28, 2022.
Chinese Office Action dated May 21, 2021 issued in CN Application No. 202010118682.1.
U.S. Appl. No. 16/821,087, filed Mar. 17, 2020.
U.S. Appl. No. 16/821,197, filed Mar. 17, 2020.

* cited by examiner

AIR PURIFIER, AIR PURIFYING SYSTEM, AND METHOD OF CONTROLLING AIR PURIFYING SYSTEM

CROSS-REFERENCE TO RELATED APPLICATION(S)

This application claims priority under 35 U.S.C. § 119 to Korean Application No. 10-2019-0031481 filed on Mar. 19, 2019 and 10-2019-0091553 filed on Jul. 29, 2019, whose entire disclosure(s) is/are hereby incorporated by reference.

BACKGROUND

1. Field

The present disclosure relates to an air purifier, an air purifying system, and a method of controlling the air purifying system.

2. Background

An air cleaner or purifier may be a device or apparatus which suctions contaminated air, purifies the suctioned contaminated air, and then discharges purified air. The air cleaner may include a fan to suction outside or ambient air into an interior of the air cleaner and a filter to filter pollutants or contaminants including dust, germs, etc. in the suctioned air. Generally, an air purifier is configured to purify an indoor space such as a home or office.

Many outside pollutants may be brought indoors by attaching to clothes. Clothing and/or hair treatment devices such as stylers may incidentally remove pollutants from clothes. KR 10-2006-0089191 discloses a multifunctional dryer with ultra-high speed hair, hand, and body drying and dust removal (alternatively called an "air wash.") The above-described multifunctional dryer is installed at a wall and blows air through an opening toward a body and clothes. Foreign matter and dust may be blown away from the clothes by the air flow and scattered into the room, further polluting the indoor air.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
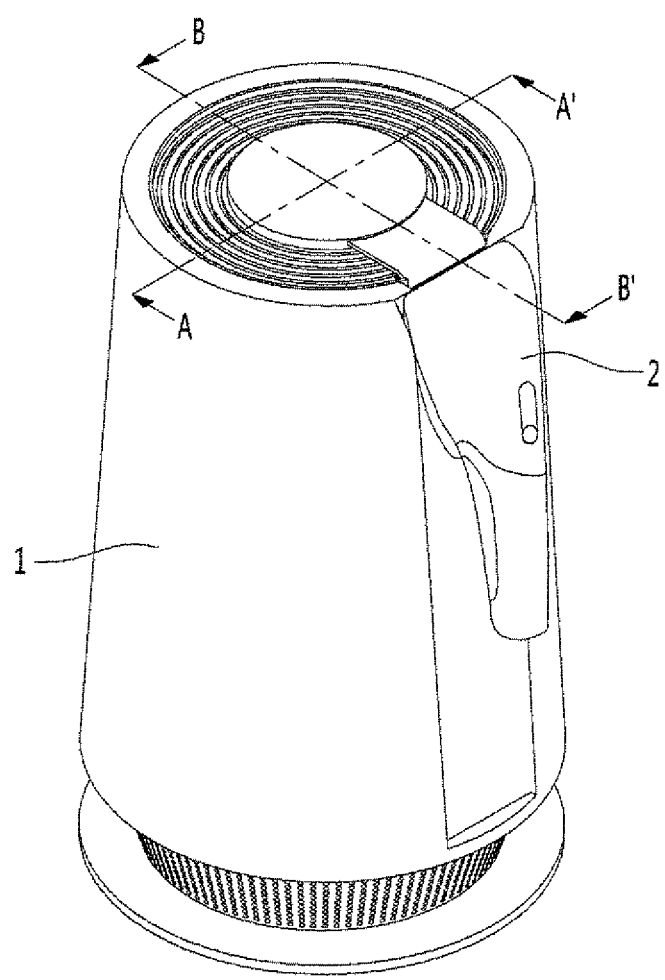
FIG. 1 is a perspective view of an air purifying system according to an embodiment.

Referring to FIG. 1, an air cleaning or purifying system according may include a main air cleaner or purifier 1 capable of purifying a large volume of air and a moving handheld air cleaner or purifier 2 capable of cleaning or treating a specific area. The handheld air purifier 2 may be capable of purifying a smaller volume of air than the main air purifier 1, and may also be referred to as a portable or moveable air purifier or dust vacuum. The main air purifier 1 may generally keep air in an indoor space clean, while the handheld air purifier 2 may be brought closer to surfaces that a user wishes to clean (e.g., garments, rugs, sheets, etc.)

While the main air purifier 1 may be in a fixed or predetermined position, the handheld air purifier 2 may be moveable by a user. The main air purifier 1 may also be moved or repositioned, although the main air purifier 1 may be heavier and more difficult to handle than the handheld air purifier 2. Alternatively, the main air purifier 1 may be fixed to or installed on a wall or a floor. The handheld air purifier 2 may be more suitable for frequent use or adjustment by the user as compared to the main air purifier 1.

The main air purifier 1 may have a larger maximum air cleaning or purifying capacity per unit time than a maximum air cleaning or purifying capacity per unit of time of the handheld air purifier 2. Air cleaning or purifying capacities may be measured by cubic feet of air per minute or CFM.

When a fan 35 (FIG. 3) inside the handheld air purifier 2 is rotated at its maximum speed and a fan 160 (FIG. 4) inside the main air purifier 1 is rotated at its minimum speed, the current air cleaning capacity or CFM of the handheld air purifier 2 may be equal to or less than the current air cleaning capacity or CFM of the main air purifier 1. Alternatively, the handheld and main air purifiers 2 and 1 may be configured such that, when the fan 35 (FIG. 3) inside the handheld air purifier 2 is rotated at its maximum speed and the fan 160 (FIG. 4) inside the main air purifier 1 is rotated at its minimum speed, the current air cleaning capacity of the handheld air purifier 2 is greater than the current air cleaning capacity of the main air purifier 1, reversing an air cleaning capacity relationship between the main and handheld air purifiers 1 and 2.

The main air purifier 1 may be placed in an indoor space or room that is close to surfaces to be treated (e.g., a living room, a bathroom, a laundry room, or a clothes or closet room) and/or may be strategically positioned so that air in an entire indoor residence may be kept clean (e.g., in a living room or family room, a foyer, a central hallway, etc.)

The handheld air purifier 2 may be configured to be hand-held and portable by a user. The handheld air purifier 2 may be used to remove and/or vacuum dust or other foreign matter from clothes, sheets, towels, rugs, laundry, curtains, drapes, etc. For convenience of description, the terms "dust" and "garment" will be used, but embodiments disclosed herein are not limited thereto. The handheld air purifier 2 may suction air on a surface of the garment, filter dust, and then discharge clean air.

The main air purifier 1 may perform its own air purifying function regardless of an operating state of the handheld air purifier 2 when the handheld air purifier 2 is mounted on the main air purifier 1. The handheld air purifier 2 may be mounted on an outer wall or surface of the main air purifier 1.

The handheld air purifier 2 may be used when separated from the main air purifier 1, and may not perform an air purifying function while mounted on the main air purifier 1 to save power and prolong a use life of the handheld air purifier 2. Alternatively, the handheld air purifier 2 may perform an air purifying function while being mounted on the main air purifier 1 to supplement an air purifying function of the main air purifier 1. While mounted on the main air purifier 1, the handheld air purifier 2 may be charged and may communicate with the main air purifier 1.

Figure 2:
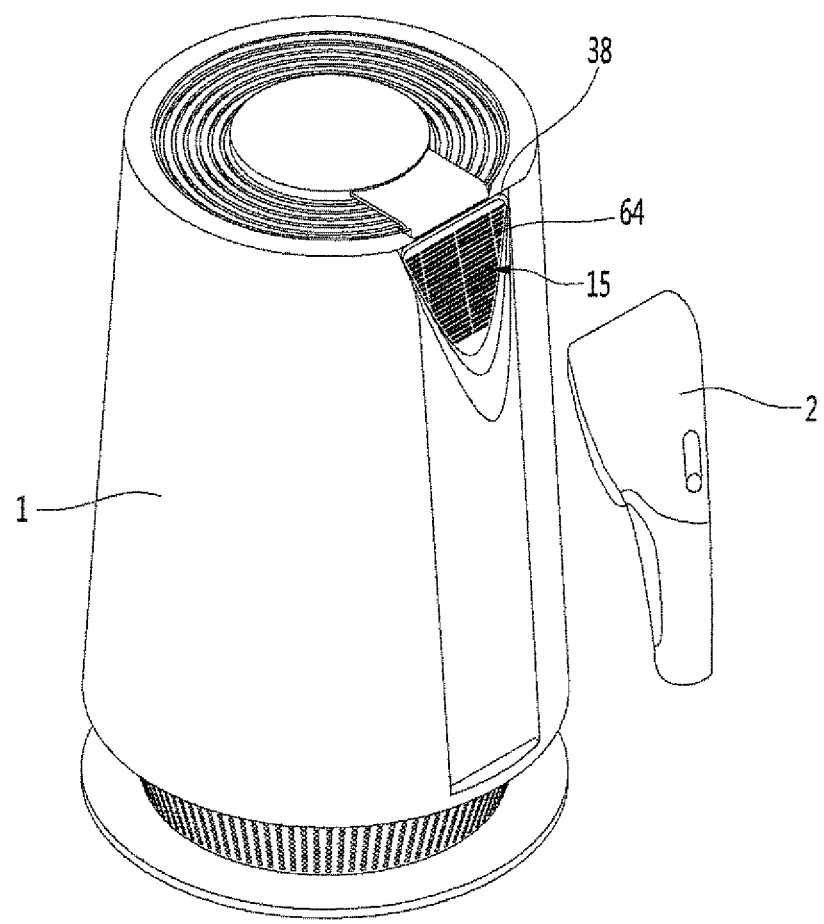
FIG. 2 is a view showing a handheld air purifier separated from a main air purifier.
Figure 3:
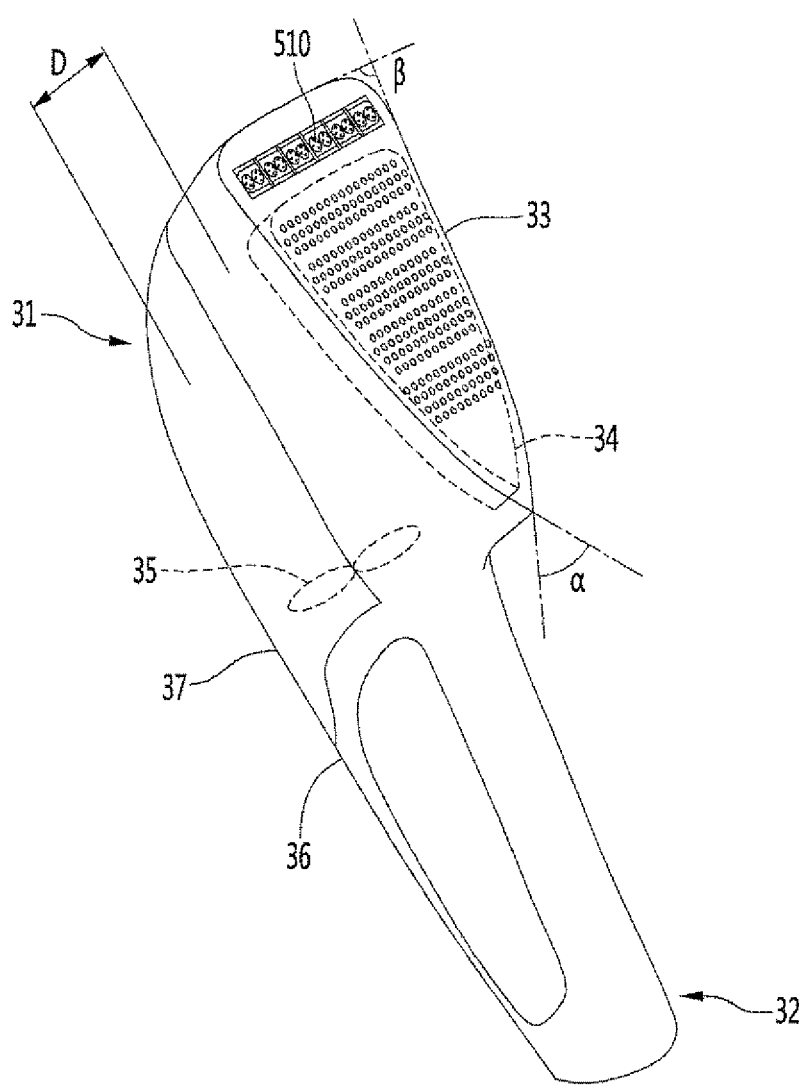
FIG. 3 is a front view of the handheld air purifier.

Referring to FIGS. 2 and 3, the outer surface of the main air purifier 1 may have a mounting portion or area 15 on which the handheld air purifier 2 may be mounted. The mounting portion 15 may be an inclined, bent, or curved surface on which the handheld air purifier 2 may be seated, or alternatively may be a recess or pocket in which the handheld air purifier 2 may be inserted. Details of the mounting portion 15 will be described with reference to FIG. 6.

A light 38 (e.g., light emitting diode or light emitting diode panel) may be provided on the mounting portion 15. The light 38 may be configured to automatically illuminate as needed. When the handheld air purifier 2 is disconnected or separated from the main air purifier 1, the light 38 may be automatically turned on to emit light. The light 38 may be useful for a user using the handheld air purifier 2 treat clothes, even if the room is not very dark. Alternatively or in addition thereto, there may be a light sensor that senses illumination in a room or how dark a room is. When the illumination is less than a predetermined illumination amount or level (i.e., when the room is relatively dark), the light 38 may be automatically emitted when the handheld air purifier 2 is separated from the main air purifier 1. As another alternative, there may be a second light provided on the outer surface of the main air purifier 1 that is configured to emit light based on the light sensor regardless of whether the handheld air purifier 2 is mounted on the main air purifier 1. Such a light may render the main air purifier 1 to serve as a light device.

A dust suction port or a dust inlet 64 may be provided on a surface of the mounting portion 15. The dust inlet 64 may be include a plurality of holes or openings, which may be aligned with a suction surface 33 of the handheld air purifier 2 when the handheld air purifier 2 is mounted on the main air purifier 1. Foreign matter or dust attached to the suction surface 33 of the handheld air purifier 2 may be suctioned by the main air purifier 1 through the dust inlet 64 to remove dust on the suction surface 33 of the handheld air purifier 2. An action of the dust inlet 64 will be described later with reference to FIG. 6.

The handheld air purifier 2 may include a suction body 31 extending in a first direction and a handle 32 extending from the suction body 31 in the first direction. The handle 32 may be configured to be held by a user's hand. The handle 32 may be oriented downward when the handheld air purifier 2 is mounted on the main air purifier 1. For example, the suction body 31 of the handheld air purifier 2 may hang from a top of the mounting portion 15. Alternatively, the handle 32 may be oriented upward while the support body 31 is supported in a recess of the mounting portion 15. A mounting arrangement between the handheld air purifier 2 and the mounting portion 15 may be configured so that the user may more conveniently grasp the handle 32 to separate and mount the handheld air purifier 2 on the the main air purifier 1.

The suction body 31 may have an approximate triangular shape or cross-section. For example, the front and rear sides if the first direction is oriented vertically (or alternatively, top and bottom sides if the first direction is oriented horizontally) of the suction body 31 may have isosceles triangle shapes with rounded corners. For convenience of description, sides of the suction body 31 will be described with reference to FIG. 2 as if the handheld air purifier 2 is mounted on the main air purifier 1 and the first direction is oriented vertically. A side of the suction body 31 having the suction surface 33 may be referred to as a front side, while a rear side is a side opposite the front side. When the handheld air purifier 2 is mounted on the main air purifier 1, the front side of the handheld air purifier 2 may face inward toward the mounting portion 15 while the rear side may face outward or away from the main air purifier 1. The rear side may include a user interface (e.g., a button or switch) for the user to control the handheld air purifier 2.

The suction surface 33 may be a two-dimensional or flat triangular plane structure. The suction surface 33 may have an isosceles triangular shape having two vertices forming upper corners provided at an upper end and one vertex forming a lower corner provided at a lower end of the suction surface 33. The two vertices forming the upper corners will hereinafter be referred to as upper vertices, but may also be referred to as outer corners or vertices. The one vertex forming the lower corner will hereinafter be referred to as the lower vertex, but may also be referred to as an inner corner or vertex. The lower vertex may have a first angle $\alpha$ and each of the upper vertices may have a second angle $\beta$.

The first and second angles $\alpha$ and $\beta$ of the suction surface 33 may be configured to remove dust from side or corners of a garment, including a crotch area of pants where the legs join. The shape of the suction body 31 may be configured to be easily inserted into folded or seamed areas of a garment (e.g., in the fly or in a pocket). As a result, dust from every corner of a folded portion of the garment may be suctioned and removed.

Each of the first and second angles $\alpha$ and $\beta$ may be less than 90°. The upper end of the suction surface 33 may include a striking member 510. The striking member 510 may be configured to beat or hit garments and may be operated by air suctioned into the handheld air purifier 2. The striking member 510 will be described later with reference to FIGS. 12-16.

A filter 34 may be fixed to an interior or inner side of the suction surface 33 to remove foreign matter from the air suctioned through the suction surface 33. A shape of the filter 34 may be configured to match a shape of the suction surface 33, and may be greater than or equal to a size of the suction surface 33 so the filter 34 may filter dust from air suctioned through the suction surface 33. The filter 34 may be a HEPA filter, a carbon filter, a pleated filter, a mesh filter or strainer, a foam material, etc. or any combination of these filters.

A connection or curved portion 37 may be provided between the suction body 31 and the handle 32. The connection portion 37 may be bent or curved so that, a user holding the handle 37 may not contact a garment even when the suction surface 33 touches the garment. To this end, the handle 37 may extend upward obliquely via the connection portion 37 to be stepped from the suction body 31. A geometric center of the handle 32 may be shifted backward by 'D' from a geometric center of the suction body 31.

At least one of the connection portion 37 or the suction member 31 may be provided with a discharge port or outlet 36 through which clean air may be discharged. Clean air filtered by the filter 34 may be discharged through the discharge port 36. The discharge port 36 may include a plurality of holes, openings, or vents, which may be provided on at least one of a left side, a right side, or the rear side of the handheld air purifier 2. A position of the discharge port 36 may be configured such to reduce an amount of air discharged from the discharge port 36 from blowing toward garments treated by the suction surface 33, reducing a probability of dust scattering from the garment and reducing an overall pollution of the indoor environment.

A fan 35 may be provided in the suction body 31 or the connection portion 37 between the discharge port 36 and the filter 34 to suction air through the filter 34 and the suction surface 33. The suctioned air may contain dust attached to the garment, and the filter 34 may filter the dust so that clean air is discharged from the discharge port 36.

The handheld air purifier 2 may optionally include a motor, a HEPA filter, and a dust bin to collect dust suctioned into the handheld air purifier 2. The handheld air purifier 2 may optionally include a removable nozzle or hose.

Figure 4:
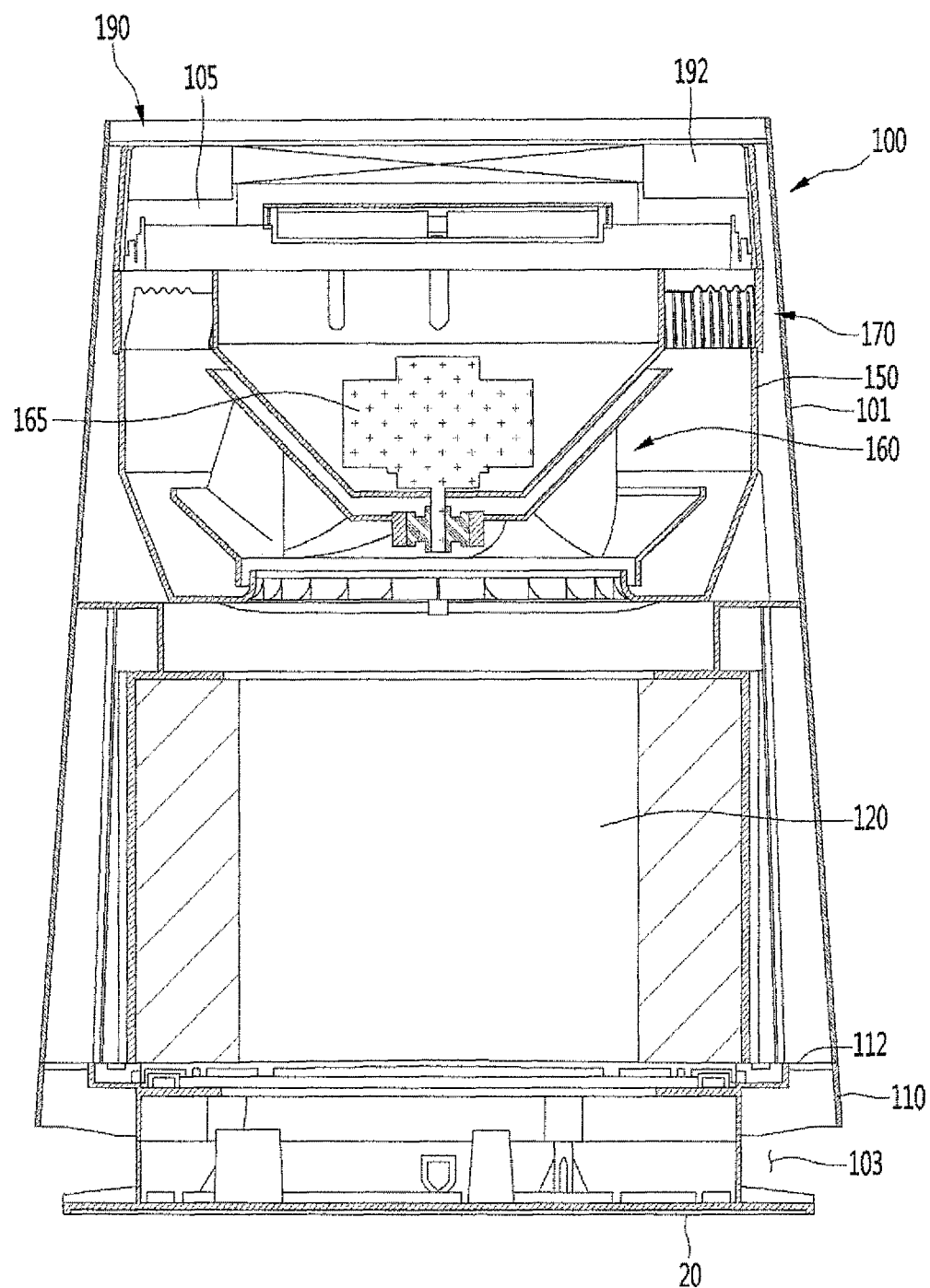
FIG. 4 is a cross-sectional view taken along line A-A' in FIG. 1.
Figure 5:
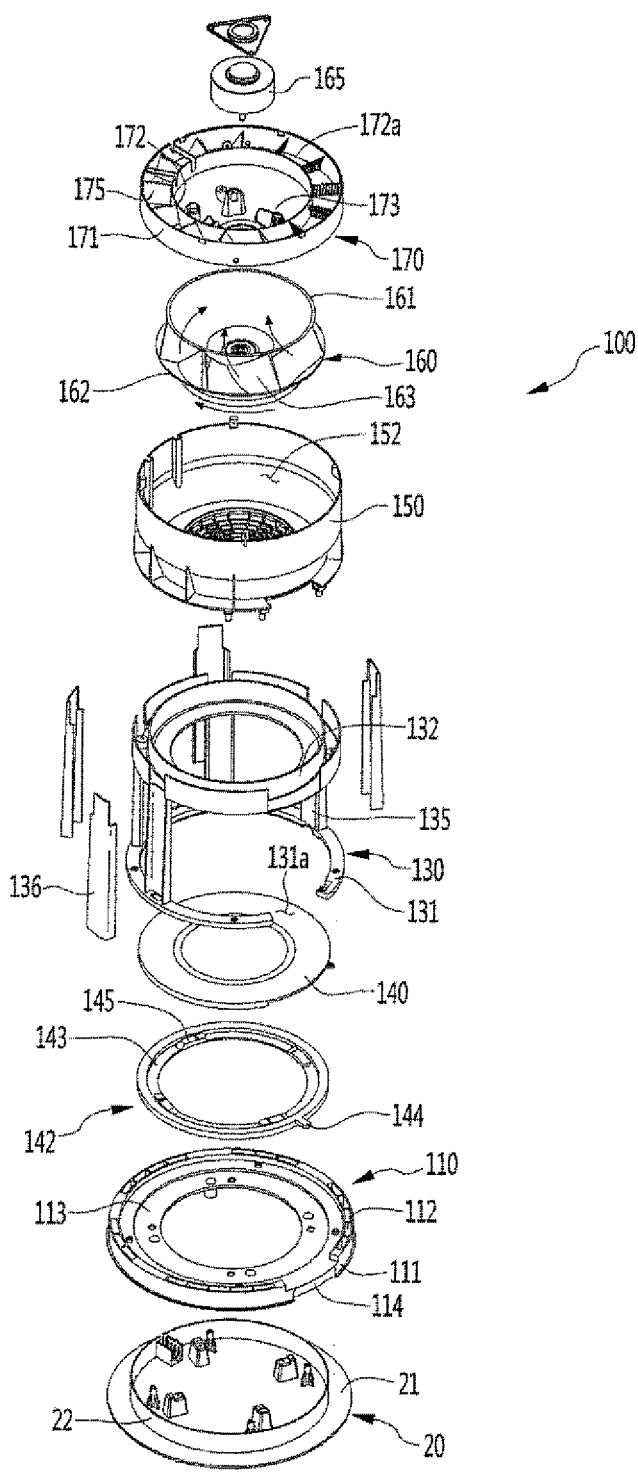
FIG. 5 is an exploded perspective view of an internal configuration of a blower or fan in the main air purifier.

Referring to FIGS. 4 and 5, the main air purifier 1 according to an embodiment may also generate an air flow and suction ambient air from a lower side of the main air purifier 1. The main air purifier 1 may include a fan 160 to suction ambient air and a filter 120 to filter the suctioned air.

The main air purifier 1 may include a case 101 forming an outer appearance or surface. The case 101 may be provided as a circular cylinder or hollow truncated cone. The main air purifier 1 may be referred to as an air purifying module in that may purify or filter air through the filter 120.

The case 101 may include a separating device or lock in which two separate shells constituting the case 101 are joined or separated to open and close the case 101. The case 101 may further include a hinge provided on a side of the case 101 opposite to a side of the case 101 having the lock so that the two shells may rotate about the hinge during opening and closing. When the case 101 is opened, the case 101 may further be separated or removed from the main air purifier 1 for replacement. The case 101 may also be opened to replace or repair internal devices (e.g., the fan 160) of a blowing or suction assembly 100. A side suction portion having a plurality of through holes through which air is suctioned may be optionally formed in a lower portion or outer surface of the case 101.

A vertical direction may be referred to as an axial direction, and a horizontal direction may be referred to as a radial direction. The axial direction may correspond to a central axis or motor axial direction of the fan 160. The radial direction may be perpendicular to the axial direction. A circumferential direction may be a circular direction rotating about the axial direction with a turning radius in the radial direction.

The main air purifier 1 may include a base 20 provided below the case 101 and placed on a floor or ground surface. The base 20 may be provided below a lower end of the case 101. At least a portion of the base 20 may be laterally or vertically spaced apart from the case 101. A base suction portion or port 103 may be formed by a space between the case 101 and the base 20. A suction grill 110 may extend below the lower end of the case 101. The base suction portion 103 may be a space between the base 20 and the suction grill 110, and may include or communicate with a suction port 112 formed in the suction grill 110. Air sucked through the base suction portion 103 may flow upward through the suction port 112.

A discharge port or portion 105 may be formed in an upper portion of the main air purifier 1. Air discharged through the discharge portion 105 may flow upward in the axial direction. Clean air discharged through the discharge portion 105 may be spread radially by a discharge grill 192 provided downstream (i.e., above) the discharge portion 105. The discharge grill 192 may be an opening formed in a spiral shape such that clean air discharged through the discharge portion 105 and the discharge grill 192 may have a velocity component in the circumferential direction. The discharge portion 105 and the discharge grill 192 may collectively be referred to as a discharge guide device 190.

The base 20 may include a base body 21 configured to be placed on the floor and a base protrusion or flange 22 protruding upward from the base body 21. The base protrusion 22 may surround engagement devices provided on an upper surface of the base body 21 and configured to couple to holes formed in and/or engagement devices on a bottom of the grill body 111. At least a portion of the suction grill 110 and/or the case 101 may be placed on the base protrusion 22. The base suction portion 103 may form an air suction space provided adjacent to the base body 21 and flange 22, the suction grill 110, and/or a bottom end of the case 101.

The suction grill 110 may include a substantially ring-shaped grill body 111 and a plurality of suction ports or openings 112 formed at an edge or rim of the grill body 111. There may be sets of suction ports 112 spaced apart from each other along the rim in the circumferential direction. The plurality of suction ports 112 may communicate with the base suction portion 103.

The main air purifier 1 may further include a filter or filter assembly 120 provided on or above the suction grill 110 to filter air suctioned through the suction port 112 and the base suction portion 103. Air may flow through the outer circumferential surface of the filter 120 and into the inside thereof. The filter 120 may have a cylindrical shape and a filter surface to filter air, but a shape of the filter 120 is not limited. A shape of the filter 120 may be configured to correspond to an inner contour of the case 101. For example, if the case 101 had a cubic shape, the filter 120 may also have a cubic shape. A type of filter 120 is not limited. For example, the filter 120 may be a HEPA filter, a carbon filter, a pleated filter, a mesh filter or strainer, a foam material, etc. or any combination of these filters.

The suction grill 110 may include a lever support portion or inner edge 113 to form an upper surface of the grill body 111 and to support a lever or locking device 142. The lever support portion 113 may be an inner radial edge recessed downward from an outer portion or edge of the grill body 111. An outer peripheral surface of the grill body 111 may have a groove or opening 114. The groove 114 may provide a space in which a handle or protrusion 144 of the lever device 142 may move.

The lever device 142 may be provided on the suction grill 110 and may be operated by a user. The lever device 142 may include a lever body 143 having a ring shape, and the lever device 142 may be rotated with respect to the suction grill 110 via the handle 144. The filter 120 may be provided on a filter support or support device 140, which may be seated on the lever body 143 of the lever device 142. When the lever device 142 is rotated clockwise or counterclockwise, the filter support 140 may be raised or lowered to fix and loosen the filter 120 for securing and removal.

The lever body 143 may include a lever protrusion or lock 145 protruding upward from an outer edge or rim of an upper surface of the lever body 143. There may be a plurality of lever protrusions 145 provided on the lever body 143 that are spaced apart from each other in the circumferential direction. Each lever protrusion 145 may have an inclined surface that is inclined upward or downward in the circumferential direction. The lever protrusions 145 may engage with a bottom of the filter support 140.

The handle 144 may protrude in the radial direction from the outer edge or an outer peripheral surface of the lever body 143. The user may hold the handle 144 and rotate the lever body 143 clockwise or counterclockwise by rotating the handle 144 in the groove 114.

The filter support 140 may be configured to hold or support the filter 120, and the lever device 142 may support the bottom of the filter support 140. The bottom of the filter support 140 may include a support protrusion that protrudes downward from an outer edge to contact or engage with the lever protrusion 145. There may be a plurality of support protrusions corresponding to the plurality of lever protrusions 145. Each support protrusion may have an inclined surface upward or downward in the circumferential direction.

When the lever body 143 is rotated via the handle 144, the lever protrusion 145 may be rotated with respect to the support protrusions of the filter support 140. When an upper or higher portion of the lever protrusion 145 abuts or contacts a lower portion of the support protrusion, the filter support 140 may be pushed upward to fix a position of the filter 120. In such a configuration, the inclined surfaces of the lever protrusion 145 and the support protrusion may not exactly align. When a lower portion of the lever projection 145 contacts or abuts an upper or higher portion of the support protrusion, the filter support 140 may descend downward. In such a configuration, the inclined surfaces of the lever protrusion 145 and the support protrusion may be aligned. When the filter support 140 is descended downward, a space may be formed so that the filter 120 may be removed from the main air purifier 1 purifier 2.

The main air purifier 1 may further include a filter frame 130, which may form a space in which the filter 120 may be mounted. The filter frame 130 may include a first or lower frame 131 forming a lower portion of the filter frame 130 and a second or upper frame 132 forming an upper portion of the filter frame 130.

The first frame 131 may have an approximate ring shape. An inner space of the first frame 131 may form at least a part of an air flow passage or channel passing through the filter frame 130.

The lever device 142 and the filter support 140 may be provided within an inner circumferential surface of the first frame 131. An upper surface of the filter support 140 may include a seating surface on which the filter member 120 is placed. The first frame 131 may include a cutout portion or a handle space 131a that allows movement of the handle 144 of the lever device 142. The handle 144 may be rotated clockwise or counterclockwise in the handle space 131a to rotate the filter support 140.

The second frame 132 may be provided above and spaced apart from the first frame 131. The second frame 132 may have an approximate ring shape. An inner space of the second frame 132 may form at least a part of the air flow passage passing through the filter frame 130. An upper portion or surface of the second frame 132 may support a fan housing 150, which will be described later.

The filter frame 130 may further include a side support or wall 135 extending between rims of the first frame 131 and the second frame 132. The first and second frames 131 and 132 may be spaced apart from each other by the side support 135. A plurality of side supports 135 may be arranged in the circumferential direction and spaced apart from each other. A shape of the side supports 135 may resemble a partial arc and have a curvature matching a curvature of the first and second frames 131 and 132. A support cover 136 may be coupled to an outer surface of the side support 135.

A mounting space of the filter 120 may be defined by the first and second frames 131 and 132 and the plurality of side supports 135. Shapes of the first and second frames 131 and 132 and the side supports 135 may not be limited to circles to create a cylindrical mounting space for a cylindrical filter 120, and may be configured to correspond to alternative filter 120 shapes. For example, the filter 120 may have a cuboid shape, a curved cube or rectangle shape, or an ellipsoid shape, and the first and second frames 131 and 132 may have a square shape or rectangle shape, a curved square shape, cushion shape, or stadium shape, or an elliptical shape, respectively.

The filter 120 may be detachably mounted or seated in the mounting space. Air may be introduced through an outer peripheral (e.g., circumferential) surface of the filter 120. In the process of passing through the filter 120, impurities such as fine dust, dirt, or other debris in the air may be filtered. Air may be introduced into the filter 120 from any direction or at any angle with respect to the filter member 120. Accordingly, the filtering area of the air may be increased.

A mounting space may have a shape (e.g., cylindrical) corresponding to the shape of the filter 120. The filter 120 may be slidably received in the mounting space during a mounting or attachment process, and may be slidably drawn out from the mounting space in a separating or removal process.

During removal, the handle 144 may be operated to lower the filter support 140 and filter 120 into a release position. A vertical space or distance between the filter support 140 and the second frame 132 may be increased, and the filter 120 may be pulled or slid radially outward and separated from the mounting space.

During replacement, the filter 120 may be pushed or slid radially inward into the mounting space and may be placed on the upper surface of the filter support 140. The handle 144 may be operated to raise the filter support 140 and the filter 120 to an engagement position. The vertical distance between the filter support 140 and the second frame 132 may be decreased to secure the filter 120 between the filter support 140 and the second frame 132.

A suction pressure may be provided by a fan 160 to suction air through the side and base suction portions 102 and 103 and through the filter 120. The fan 160 may be provided above the filter 120 to suction air upward.

A fan housing 150 may be provided at an outlet side (i.e., above) the filter 120. The fan 160 may be provided in the fan housing 150. The fan housing 150 may be supported by the second frame 132 of the filter frame 130.

An inner surface of a lower portion of the fan housing 150 may include a fan guide or fan recess 152, which may have an inner contour or shape configured to guide an inflow of air into the fan housing 150. A lower or bottom portion of the fan recess 152 may include a grill to prevent fingers or other objects from going into the fan housing 150 during removal and insertion of the filter 120.

An optional display housing accommodating a display 1 may be provided at the top of the main air purifier 1. The display housing may be connected to the fan housing 150 for structural strength.

The fan 160 may be or include a centrifugal fan to suction air in the axial direction and to discharge air upward in the radial direction. The fan 160 may include a hub 161 coupled to a rotation shaft of a fan motor 165, which may be a centrifugal fan motor. A plurality of shrouds 162 may be provided at an outer side of the hub 161, and a plurality of blades 163 may be provided or formed between the shrouds 162. The fan motor 165 may be coupled to the fan 160.

The hub 161 may have a bowl shape having a diameter or cross-sectional area that decreases in a downward direction. The hub 161 may include a shaft coupling portion to which the rotation shaft of the fan motor 165 is coupled and a first blade coupling portion that extends upward from the shaft coupling portion in an inclined manner.

The shroud 162 may include a shroud suction port provided at a bottom or lower end to suck air that has passed through the fan recess 152. A second blade coupling portion may extend upward from the lower end of the shroud 162.

One side of the blade 163 may be coupled to the first blade coupling portion of the hub 161 and the other side of the blade 163 may be coupled to the second blade coupling portion of the shroud 162. The plurality of blades 163 may be spaced apart from each other in the circumferential direction of the hub 161.

Air passing through the filter 120 may flow upward into the fan housing 150 through the fan recess 152. The air may flow in the axial direction of the fan 160 and flow out via the blade 163. An edge of the blade may be inclined outward and upward with respect to the axial direction so that outflowing air may flow upward in the radial direction.

An air guide 170 may be coupled to the fan 160 to guide a flow of the air passing through or discharged from the fan 160. The air guide 170 may be provided above the fan housing 150. As an example, the air guide 170 may have an outer diameter corresponding to an outer diameter of the fan housing 150 and be stacked onto the fan housing 150 to guide the flow of the air from the fan 160.

The air guide 170 may include an outer wall 171 having a cylindrical shape and an inner wall 172 having a cylindrical shape located inside the outer wall 171. The outer wall 171 may surround the inner wall 172 and be spaced apart from the inner wall 172 such that a diameter of the outer wall 171 is greater than a diameter of the inner wall 172. The diameter of the outer wall 171 may define an outer diameter of the air guide 170, and the diameter of the inner wall 172 may define an inner diameter of the air guide 170. A first air passage 172a through which air flows may be formed between an inner circumferential surface of the outer wall 171 and an outer circumferential surface of the inner wall 172.

The air guide 170 may further include a motor receiving portion or container 173 extending downward from the inner wall 172 to receive the fan motor 165. The motor receiving portion 173 may have a bowl shape having a diameter that decreases in the downward direction. A motor coupler or fastener may be provided on a side of the fan motor 165, and the motor coupler may guide and fix the fan motor 165 to the air guide 170. The shape of the motor receiving portion 173 may correspond to a shape or inner contour of the hub 161 so that the motor receiving portion 173 may be inserted into the hub 161.

The fan motor 165 may be supported by an upper side of the motor receiving portion 173. The rotation shaft of the fan motor 165 may extend downward from the fan motor 165 and may be coupled to the shaft coupling portion of the hub 161 through an opening or hole formed in a bottom of the motor receiving portion 173.

The air guide 170 may further include a guide vane or rib 175 provided in the first air passage 172a. The guide vane 175 may extend from the outer circumferential surface of the inner wall 172 to the inner circumferential surface of the outer wall 171, and may extend upward in an oblique or inclined way from a lower portion of the outer wall 171 and the inner wall 172. The guide vanes 175 may be spaced apart from one another. The guide vanes 175 may add structural rigidity to the air guide 170.

The plurality of guide vanes 175 may function to guide the air introduced into the first air passage 172a from the fan 160 upward, and a shape or inclination of the guide vanes 175 may be configured to discharge air at a predetermined angle. For example, each guide vane 175 may be rounded or curved to guide the air to flow upward in the axial direction.

Figure 6:
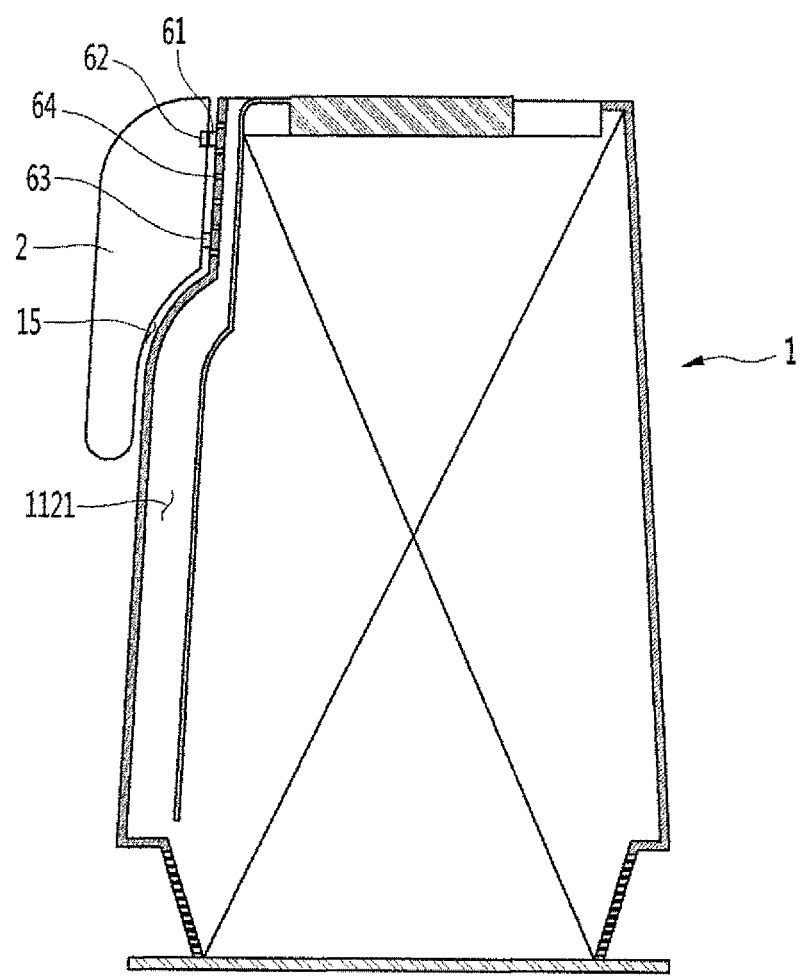
FIG. 6 is a sectional view taken along the line B-B' in FIG. 1.

Referring to FIG. 6, a mounting portion 15 may be provided at an upper end of the main air purifier 1. The mounting portion 15 may be formed as a curved recession into the case 101. The mounting portion 15 may also be viewed as curved connection portion between a lower portion of the case 101 and an upper portion of the case 101, the lower portion of the case 101 having a larger diameter or cross-sectional area than the upper portion of the case 101. A shape of the mounting portion 15 may be configured so that the handheld air purifier 2 may hang by the suction body 31 on the mounting portion 15. A curvature of the mounting portion 15 may correspond to a curvature of the connection portion 37 (FIG. 3) of the handheld air purifier 2.

Shapes of the mounting portion 15 are not limited hereto, however. For example, the mounting portion 15 may be recessed inward to have a pocket structure to support a bottom of the handheld air purifier 15. Embodiments of the mounting portion 15 are not limited to a formation within the case 101. For example, the mounting portion 15 may alternatively be or include a hook on which the suction body 31 may hang, a pair of walls in which the suction body 31 may be pressed-fit and inserted to support the suction body 31, or a magnet that keeps the handheld air purifier 2 mounted on the mounting portion 15 via a magnetic force.

As shown in FIG. 6, the handle 32 may extend downward from the suction body 31 when the handheld air purifier 2 is mounted on the main air purifier 1. Referring to FIGS. 2, 3, and 6, a magnetic coupling may be provided between the handheld air purifier 2 and the mounting portion 15 to further secure the handheld air purifier 2 during mounting.

One of the mounting portion 15 and handheld air purifier 2 may include a magnet, and the other of the mounting portion 15 and handheld air purifier 2 may include a metal or a magnet having an opposite polarity. As an example, a first magnet 61 may be provided on the mounting portion 15, and a second magnet 62 may be provided in the suction surface 33 of the suction body 31 of the handheld air purifier 2. Positions of the first and second magnets 61 and 62 may be aligned when the handheld air purifier 2 is mounted on the mounting portion 15 of the main air purifier 1. The first magnet 61 may have a first polarity, and the second magnet 62 may have a second polarity opposite to the first polarity.

The first and second magnets 61 and 62 may prevent the handheld air purifier 2 from falling off the main air purifier 1 after mounting. The first and second magnets 61 and 62 may secure the suction body 31 of the handheld air purifier 2 at a predetermined position on the mounting portion 15.

A seating sensor 63 may be provided in the mounting portion 15 to sense whether the handheld air purifier 2 is mounted on the main air purifier 1. The seating sensor 63 may be provided at a position configured to align with at least a portion (e.g., a lower portion of the suction body 31) of the handheld air purifier 2 during mounting. An operation of the air filtering system may be based on whether the seating sensor 63 has sensed a mounting or removal of the handheld air purifier 2.

The seating sensor 63 may include any type of sensor capable of recognizing an approach of the handheld air purifier 2. The seating sensor 63 may sense a change in any electrical or physical signal that may be altered by the seating of the handheld air purifier 2, such as reflected radio wave sensing, electrical shorting, mechanical switching, optical signal disconnection, weight change, magnetic force, etc. As an example, the seating sensor 63 may be a weight sensor, a Hall sensor, a touch sensor, a light sensor, a proximity sensor, a radar sensor, or use near field communication NFC to communicate with handheld air purifier 2 and sense a distance between the handheld air purifier 2 and the main air purifier 1.

The mounting portion 15 may include a charging section or portion capable of charging the handheld air purifier 2. The handheld air purifier 2 may include a chargeable battery. The main air purifier 1 may wireless charge the battery of the handheld air purifier 2 via a wireless power transfer (WPT) method using electromagnetic induction. The handheld air purifier 2 may include a wireless power receiver or transceiver, and the main air purifier 1 may include a wireless power transmitter or transceiver that aligns with the wireless power receiver of the handheld air purifier 2 when the handheld air purifier 2 is mounted on the main air purifier 1. Alternatively or in addition thereto, the handheld air purifier 2 may have a terminal that connects to a terminal of the main air purifier 1. As another example, the handheld air purifier 2 may have a cable to plug into the main air purifier 1. The main air purifier 1 may have a terminal and cable to plug into an external or commercial power supply (e.g., wall socket).

The mounting portion 15 may include an ultraviolet sterilizing section or light capable of disinfecting a vicinity of the suction surface 33 and the mounting portion 15. The ultraviolet sterilizing light may be included in the light 38 shown in FIG. 3, or may alternatively be an additional light. The ultraviolet sterilizing light may be configured to only emit ultraviolet radiation when the handheld air purifier 2 is mounted on the mounting portion 15. The ultraviolet sterilizing light may be provided at a position such that the handheld air purifier 2 covers the ultraviolet sterilizing light when mounted on the mounting portion 15 to reduce ultraviolet radiation from being emitted outward into the indoor space, as ultraviolet radiation may be harmful to a user's eyes.

The suction surface 33 of the handheld air purifier 2 and the dust suction port 64 of the main air purifier 1 may be placed in positions so as to align with each other when the handheld air purifier 2 is mounted on the mounting portion 15. A suction force and/or pressure of the main air purifier 1 may be transferred to the dust inlet 64. Referring to FIGS. 2-6, an inlet connection conduit 1121 may be formed in an interior of the case 101 to connect the suction port 112 of the main air purifier to the dust inlet 64. The dust inlet 64 may align with the suction surface 33 when the handheld air purifier 2 is mounted on the mounting portion 15 so that dust in or at the suction surface 33 may be suctioned, by the fan 160 of the main air purifier 1, through the dust inlet 64, down the inlet connection conduit 1121, and through the suction port 112 to be filtered by the filter 120 of the main air purifier 1. The handheld air purifier 2 may be maintained in a clean state so that dust removed from one garment is not transferred to another garment during a subsequent use.

Figure 7:
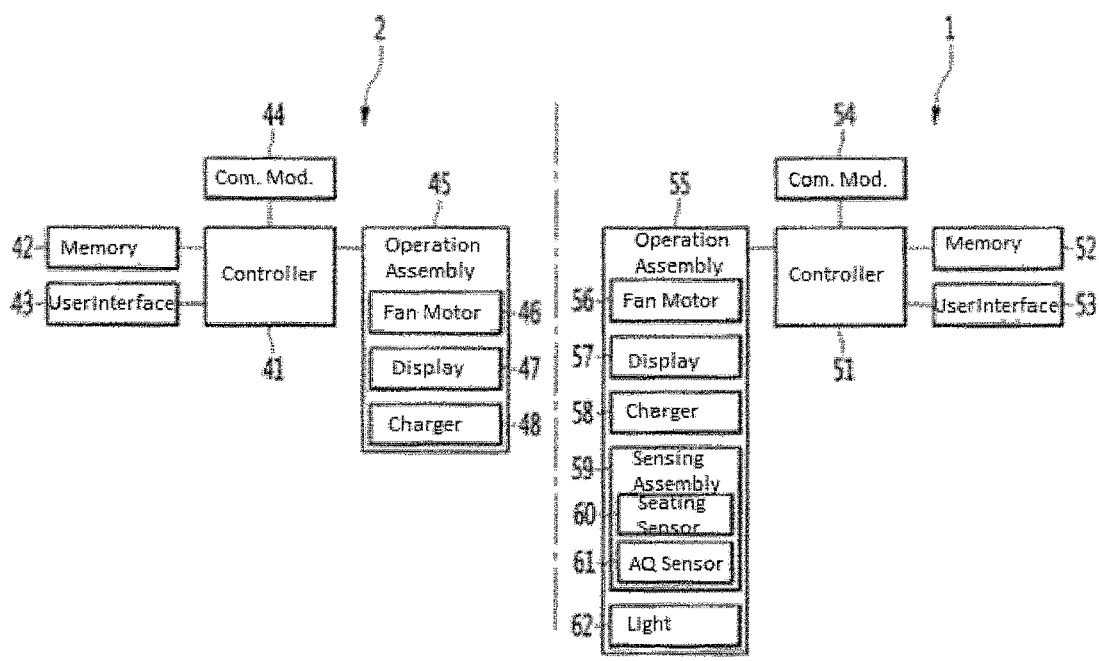
FIG. 7 is a block diagram of an air purifying system.

Referring to FIG. 7, a configuration of the air purifying system may be similar to that already described with reference to FIGS. 1-6, but different reference numbers may be given for the sake of precise description. For example, the fan 35 of the handheld air purifier 2 in FIG. 3 may be included in a fan drive device 46 in FIG. 7, which may also include a power supply device to operate the fan 35.

The air purifying system may include a main air purifier 1 and a handheld air purifier 2, which may be freely attachable to and detachable from the main air purifier 1. The main air purifier 1 may be provided with a controller 51 to control the main air purifier 1, a driving or operation assembly 55, a memory 52 to store various information necessary for operation, a communication module 54 to communicate with the handheld air purifier 2 and/or to obtain external data, and a user interface or operation device 53 into which operation information may be input. The main air purifier 1 may connect to a power supply to supply power for operation. The controller 51 may control the memory 52, communication module 54, and the operation assembly 55 based on information received by the communication module 54, information stored in the memory 52, measurements taken by a sensing assembly 59, commands input into the user interface 53, or based on a current operating status.

The operation assembly 55 may include a display 57 to display operation information and indoor environment information of the main air purifier 1, a fan driving device 56 to suction outside air to perform air purifying, a charging device 58 (e.g., wireless power transmitter or transceiver), a sensing assembly 59 to sense external or environmental conditions and a mounting of the handheld air purifier 2, and a lighting device 62 to emit light. The sensing assembly 59 may include a seating sensor 60 to detect a mounting and dismounting of the handheld air purifier 2 and a dust or air quality sensor 61 to sense a degree of pollution or contamination of an indoor environment in which the main air purifier 1 is placed. The charging device 58 may charge a charging device 48 (e.g., wireless power receiver or transceiver) of the handheld air purifier 2.

The communication module 54 connected to the controller 51 may be connected to an external device (e.g., a server) to perform communication. The communication module 54 may implement wireless communication and may be, e.g., a BlueTooth or WiFi module, or alternatively may use a wired communication. The communication module 54 may communicate with a communication module 44 ("com. mod. in FIG. 7) of the handheld air purifier 2 to exchange data (e.g., air quality data, operation status, or location data). The communication module 54 may also communicate with a fixed or portable internet of things (IOT) device that senses air quality or another external air quality sensor. The communication module 54 may optionally receive data from an external application or data source, for example, air quality or weather forecast information stored online, and may be able to transmit data to a mobile or web application. The communication module 54 may connect to an external server or network.

The handheld air purifier 2 may include a controller 41 to control the handheld air purifier 2, a driving or operation assembly 45, a memory 42 to store various information necessary for operation, a communication module 44 to communicate with the main air purifier 1 and/or to obtain external data, and a user interface or operation device 43 into which operation information may be input. The controller 41 may control the memory 42, communication module 44, and the operation assembly 45 based on information (e.g., mounting information, operating status information, or air quality information measured by the sensor assembly 59) received by the communication module 44, information stored in the memory 42, commands input into the user interface 43, charging information, or measurements taken by an optional sensing assembly.

The operation assembly 45 may include a fan driving device 46 to suction outside air to perform air purifying, a display 47 that displays operation information, charging information, and indoor environment information of the handheld air purifier 2, and the charging device 48 to charge a battery. The communication module 44 may be similar to the communication module 54 of the main air purifier 1 and may connect to the communication module 54 and/or an external device (e.g., a server) to perform communication. The communication module 44 may implement wireless communication and may be, e.g., a BlueTooth or WiFi module, or alternatively may use a wired communication. The communication module 44 may exchange data (e.g., air quality data, operation status, or location data) with the communication module 54 of the main air purifier 1. The communication module 44 may also communicate with a fixed or portable IOT device that senses air quality or another external air quality sensor. The communication module 54 may optionally receive data from an external application or data source, for example, air quality or weather forecast information stored online, and may be able to transmit data to a mobile or web application. The communication module 54 may connect to an external server or network.

Operations of the main air purifier 1 and handheld air purifier 2 may be controlled by the controllers 51 and 41, respectively, based on operation status data exchanged via the communication modules 54 and 44. The handheld air purifier 2 may be charged by a connection between the charging devices 48 and 58 when the seating sensor 60 indicates that the handheld air purifier 2 is mounted on the main air purifier 1.

When the seating sensor 60 indicates that the handheld air purifier 2 is separated from the main air purifier 1, the seating sensor 60 may transmit a predetermined or separation signal to the controller 51 of the main air purifier 1. Upon receiving the predetermined signal, the controller 51 of the main air purifier 1 may change a control state of the air purifying system. For example, the air purifying system may operate in a "mounted state" when the handheld air purifier 2 is mounted on the main air purifier 1 and a "separated state" when the handheld air purifier 2 is separated from the main air purifier 2 (i.e., when the controller receives the predetermined signal). For example, in the separated state, the light device 62 may be turned on, and/or an ultraviolet light optionally included in the light device 62 may be turned off.

In the "mounted state," the fan driving device 46 of the handheld air purifier 2 may not be operated while the fan driving device 56 of the main air purifier 1 may be operated to suction dust from the indoor environment and also off of the handheld air purifier 2. In the "separated state," the fan driving device 46 of the handheld air purifier 2 may be operated, along with the fan driving device 56 of the main air purifier 1 so that any scattered dust may be suctioned. The handheld air purifier 2 may not provide as high or strong of a filtration performance as the main air purifier 1 due to a narrow internal space of the suction body 31, and some fine dust may not be suctioned through the suction surface 33 and instead escape to a periphery of the handheld air purifier 2 during a sweeping motion on a targeted surface. The main air purifier 1 may suction fine dust not suctioned by the handheld air purifier 2.

An operation of the fan driving device 56 of the main air purifier 1 may be synchronized with an operation of the fan driving device 46 of the handheld air purifier 2. For example, speeds of the fans in the fan driving devices 56 and 46 may change based on a mounting status of the handheld air purifier 2, based on air quality information acquired from the air quality or AQ sensor 61, or based on data from external devices or other conditions. Various control methods of the air purifying system will be described below.

Figure 8:
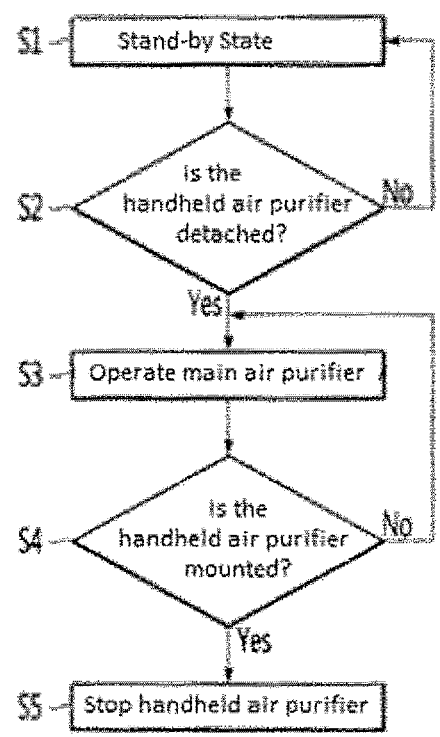
FIG. 8 is a flow chart illustrating a control method of the air purifying system.

Referring to FIGS. 7-8, the handheld air purifier 2 may be seated on the main air purifier 1, and an interlocking operation between the handheld air purifier 2 and the main air purifier 1 may be in a stand-by state (S1). In the standby state, the main air purifier 1 may be operating or not operating. The seat sensor 60 may periodically sense whether the handheld air purifier 2 is separated from the main air purifier 1 (S2).

If the handheld air purifier 2 is detached thereafter ("Yes"), the seat sensor 60 may indicate, via a separation signal, that the handheld air purifier 2 is not mounted to the main air purifier 1 (S2). The controller 51 of the main air purifier 1 may operate the operation assembly 55 based on the separation signal (S3).

As an example of a type of operation that may occur during S3, the main air purifier 1 and the handheld air purifier 2 may be turned on to operate together. The handheld air purifier 2 may suction rather than blow air containing dust. Scattering dust may be eliminated, and dust diffused into an indoor space may be reduced. However, despite the suction method implemented by the handheld air purifier 2, some dust may diffuse to its periphery due to a weaker suction strength and/or lower air cleaning capacity of the handheld air purifier 2. In addition, the striking member described later may loosen dust on garments and cause a bit of scattering. If a user sweeps the handheld air purifier 2 back and forth across a targeted surface (e.g., clothing), some finer dust may simply fall off the clothing to contaminate a floor, the indoor air, and surroundings. Such errant dust may be suctioned and filtered instead by the main air purifier 1, and scattering dust may be further reduced. A synchronized or interlocking operation between the handheld air purifier 2 and the main air purifier 1 may be automatic without prompting by a user's command. Such automatic interlocking operation may improve cleanliness and comfort of an indoor environment and convenience of the air purifying system.

The seating sensor 60 may periodically sense whether the handheld air purifier 2 has mounted back onto the main air purifier 1 (S4). If the handheld air purifier 2 has not been mounted ("No"), then interlocked operation of the handheld air purifier 2 may resume. If the seating sensor 60 indicates that the handheld air purifier 2 has been mounted on the main air purifier 1 ("Yes"), then an operation of the handheld air purifier 2 may be stopped (S5). An operation of the main air purifier 1 may not be stopped so that the main air purifier 1 may suction the dust off of the suction surface 33 of the handheld air purifier 2 via the dust inlet 64 of the mounting portion 15. Alternatively, an operation of the main air purifier 1 may be stopped along with an operation of the handheld air purifier 2 or based on a sensed air quality of the indoor environment.

Figure 9:
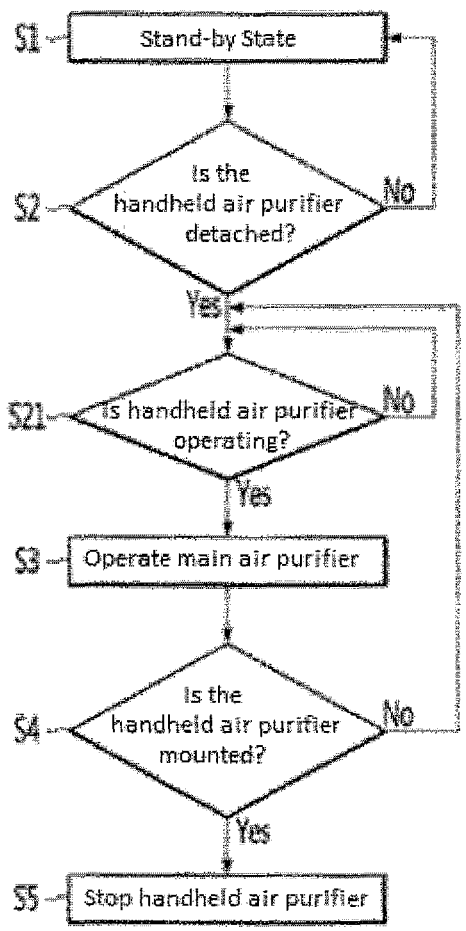
FIG. 9 is a flowchart illustrating a control method of an air purifying system according to another embodiment.

A control method shown in FIG. 9 may be the same as that of FIG. 8, and may differ only in an operation of the main air purifier 1. Referring to FIG. 9, the main air purifier 1 may not start simultaneously with the handheld air purifier 2 and may instead start at a time after.

S1 may be the same standby step as in FIG. 8. S2 may be the same sensing step as in FIG. 8. If the seating sensor 60 indicates that the handheld air purifier 2 is separated from the main air purifier 1 ("Yes"), the handheld air purifier 2 may be operated, but the main air purifier 1 may remain off or turn off it was previously operating (S21).

During S21, an operation status of the handheld air purifier 2 may be periodically transmitted to the main air purifier 1 via the communication modules 44 and 54. If the handheld air purifier 2 has not been started (either automatically or, alternatively, manually by a user), the operation status of the handheld air purifier 2 may continue to be exchanged. Once the handheld air purifier 2 has started ("Yes"), the main air purifier 1 may be operated in step S3. Such a delayed operation of the main air purifier 1 may reduce unnecessary power consumption. S4 and S5 may be the same sensing and stopping steps as in FIG. 8, respectively.

Figure 10:
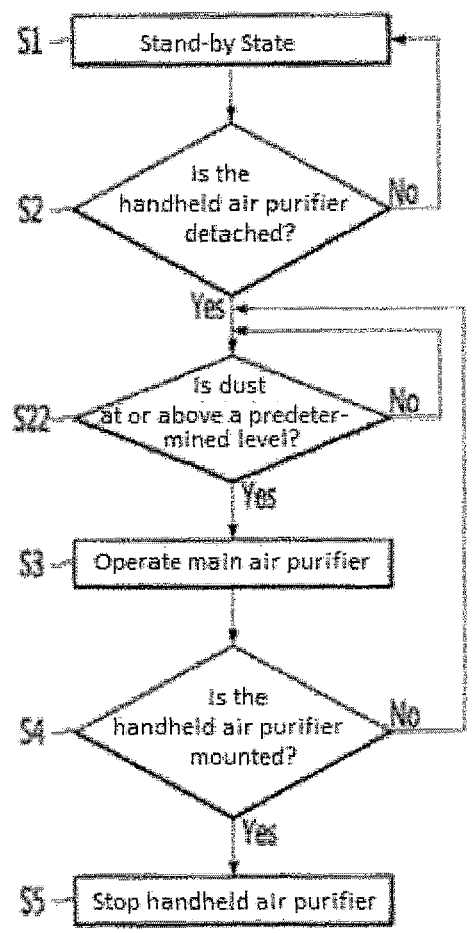
FIG. 10 is a flow chart illustrating a control method of an air purifying system according to another embodiment.

A control method shown in FIG. 10 may be the same as that of FIGS. 8 and 9, and may differ only in an operation of the main air purifier 1. Referring to FIG. 10, the main air purifier 1 may be not operated immediately even if the handheld air purifier 2 is detached or started. Instead, the main air purifier 1 may wait to operate until dust is detected by the air quality sensor 61.

S1 may be the same standby step as in FIGS. 8 and 9. S2 may be the same sensing step as in FIGS. 8 and 9. If the seating sensor 60 indicates that the handheld air purifier 2 is separated from the main air purifier 1 ("Yes"), the handheld air purifier 2 may be operated, but the main air purifier 1 may remain off or turn off it was previously operating (S22).

During S22, a pollution or contamination level of an indoor space may be periodically measured by the dust sensor 61 and transmitted to the main air purifier 1. If the dust sensor 61 does not sense dust and/or measures the contamination level to be below a predetermined contamination level, the contamination level may continue to be measured and exchanged. Once the dust sensor 61 indicates that the contamination level is at or above the predetermined contamination level ("Yes"), the main air purifier 1 may be operated in step S3. S22 may optionally measure and transmit an operation status of the handheld air purifier 2, and proceeding to step S3 may optionally require that the handheld air purifier 2 is operating, in addition to dust being detected at or above the predetermined contamination level. Such a delayed operation of the main air purifier 1 may reduce unnecessary power consumption. S4 and S5 may be the same sensing and stopping steps as in FIGS. 8 and 9, respectively.

Figure 11:
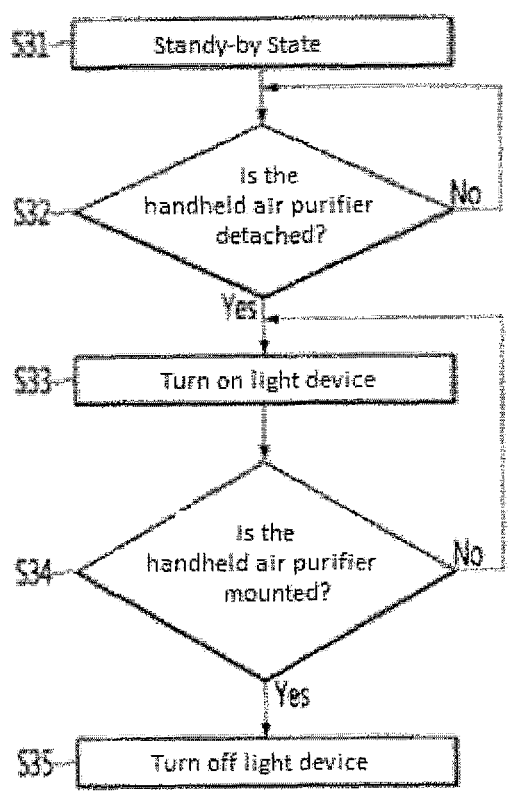
FIG. 11 is a flowchart illustrating a control method of an air purifying system according to another embodiment.

Referring to FIGS. 7 and 11, a control method shown in FIG. 11 focuses on an operation of the light device 62 of the main air purifier 1. The control method shown in FIG. 11 may be combined with any of the control methods of the air purifying system shown in FIGS. 8-10.

The first two steps S31 and S32 may be similar to the standby steps and mounting sensing steps of FIGS. 8-10. The handheld air purifier 2 may be mounted on the main air purifier 1, and an interlocking operation between the handheld air purifier 2 and the main air purifier 1 may be in a standby state (S31). In the standby state, the main air purifier 1 may be operating or turned off. The seating sensor 60 may periodically sense whether the handheld air purifier 2 has been separated from the main air purifier 1 (S32). If the handheld air purifier 2 has not been separated ("No"), the standby state S31 and sensing S32 may resume.

If the handheld air purifier 2 has been separated ("Yes"), the seating sensor 60 may send a separation signal to the controller 51. The controller 51 may control the light device 62 to turn on based on the separation signal (S33). The light device 62 may illuminate an area near the main air purifier 1 in which a garment to be treated by the handheld air purifier 2 may be placed. The user may conveniently remove dust from the garment using illumination from the light device 62. Alternatively or in addition thereto, the handheld air purifier 2 may have a light device that is turned on upon separation from the main air purifier 1. Such an alternative light device may be on a same side of the handle 32 and/or suction body 31 that the suction surface 33 is provided so that the light device may emit light toward the garment during treatment.

The light device 62 may correspond to the light 38 as shown in FIG. 2. Since the light device 62 may turn on once the handheld air purifier 2 is separated and since such light emitted from the light device 62 may be more visible when the handheld air purifier 2 is separated, the light device 62 may serve to inform a user of a separation of the handheld air purifier 2.

The light device 62 may be provided close to the mounting portion 15 of the main air purifier 1. The user may apply the suction surface 33 of the handheld air purifier 2 along an outer surface of the garment on which light from the light device 62 may be shined, and the main air purifier 1 may quickly suction scattered dust that is not suctioned by the handheld air purifier 2, improving convenience and accuracy.

The light device 62 may be close to a suction portion of the main air purifier 1. The user may be encouraged, by the light emitted by the light device 62, to remove dust from clothes in the vicinity of the main air purifier 1. Accordingly, a position of the main air purifier 1 and a dusty garment may be close so that the main air purifier 1 may suction dust that may not be filtered and instead scattered by the handheld air purifier 2. As a result, a floor and indoor space around the air purifying system may be cleaner. Since a suction portion (e.g., suction portion 103) of the main air purifier 1 may be provided toward a bottom portion of the main air purifier 1, falling dust may be suctioned through and filtered in the main air purifier 1.

The seating sensor 60 may periodically sense whether the handheld air purifier 2 is mounted back on the main air purifier 1 (S34). If the seating sensor 60 does not sense that the handheld air purifier 2 is mounted on the main air purifier 1 ("No"), the light device 62 may continue to emit light in step S33. If the seating sensor 60 senses that the handheld air purifier 2 is mounted on the main air purifier 1 ("Yes"), the illumination device 62 may be turned off (S35). In addition, the main air purifier 1 may be turned off, along with the handheld air purifier 2.

Alternatively, an operation of the handheld air purifier 2 and the illumination device 62 may be linked. When the handheld air purifier 2 is turned on (either manually or in accordance with any of the control methods shown in FIGS. 8-10), its "on" status may be communicated to the controller 51 of the main air purifier 1 via the communication modules 44 and 54, and the light device 62 may be turned on. When the handheld air purifier 2 is turned off, the light device 62 may be turned off.

When dust or other foreign materials are attached to a user's clothes and garments, the main air purifier 1, the handheld air purifier 2, and optionally the light device 62 may work together to efficiently and conveniently remove the foreign materials. However, the air quality sensor 61 may, in certain cases, not provide an accurate estimate on how much dust is actually attached to the clothes or what kind of outdoor air the clothes were exposed to. This may occur when, for example, a person has worn clothes in a dustier environment than an immediate environment surrounding the main air purifier 1.

It may be necessary to operate the air purifying system according to the air quality sensor 61, and may instead be necessary to consider weather forecasts, news, or air qualities measurements at other locations. Some of this data may be optionally obtained by the communication modules 54 and 44 in interacting with weather forecast apps, the internet, or IOT devices such as air quality sensor IOT devices that measure air quality. However, if such data is not available or attainable, the user may control the air purifying system based on his own perceptions of air quality or his own outside information.

The main air purifier 1 may continue to operate after the handheld air purifier 2 is seated on the main air purifier 1 so that dust may be suctioned via the dust inlet 64 of the mounting portion. Alternatively, when the handheld air purifier 2 is turned off, the main air purifier 1 may be automatically stopped even before the handheld air purifier 2 is seated on the main air cleaner 1.

Figure 12:
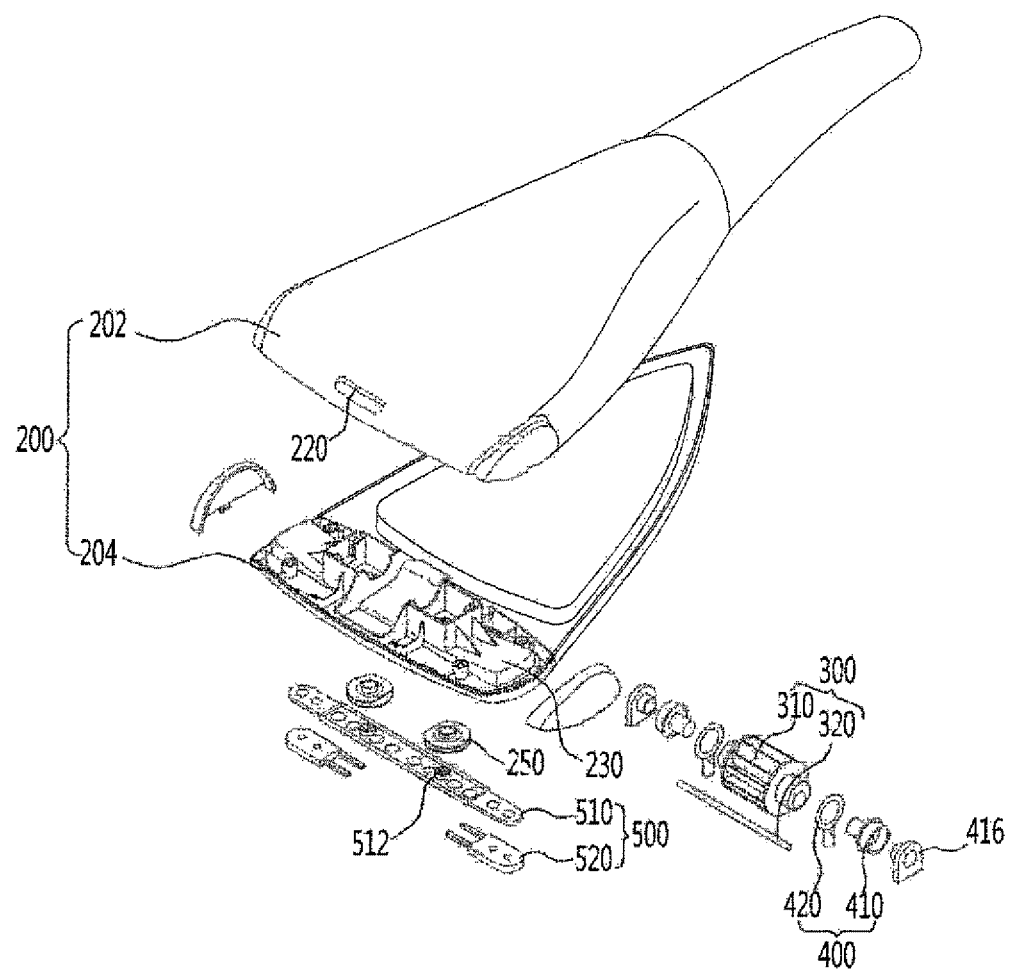
FIG. 12 is an exploded perspective view of an assembly to drive a striking member.
Figure 15:
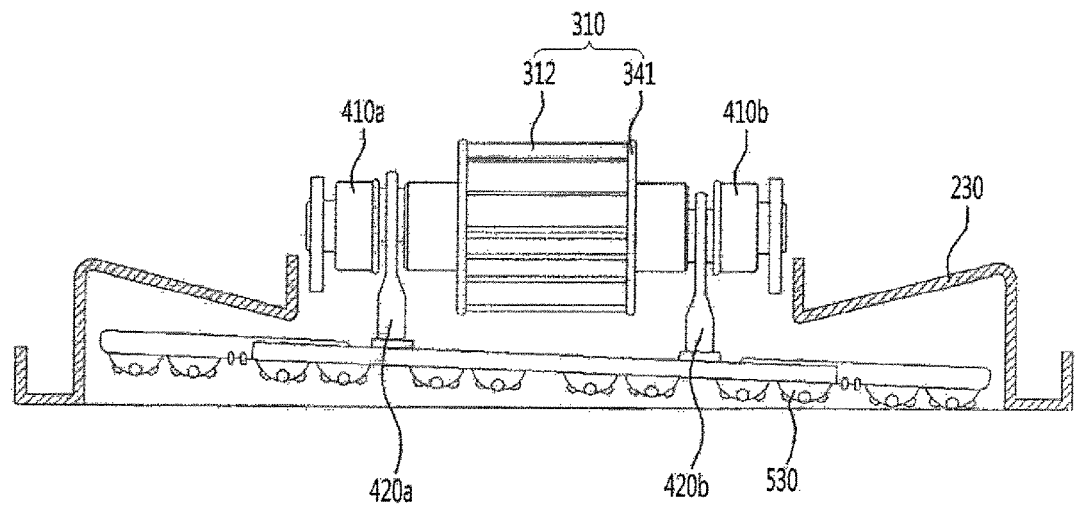
FIGS. 15 and 16 illustrate a sequential movement or operation of the striking member according to an embodiment.
Figure 16:
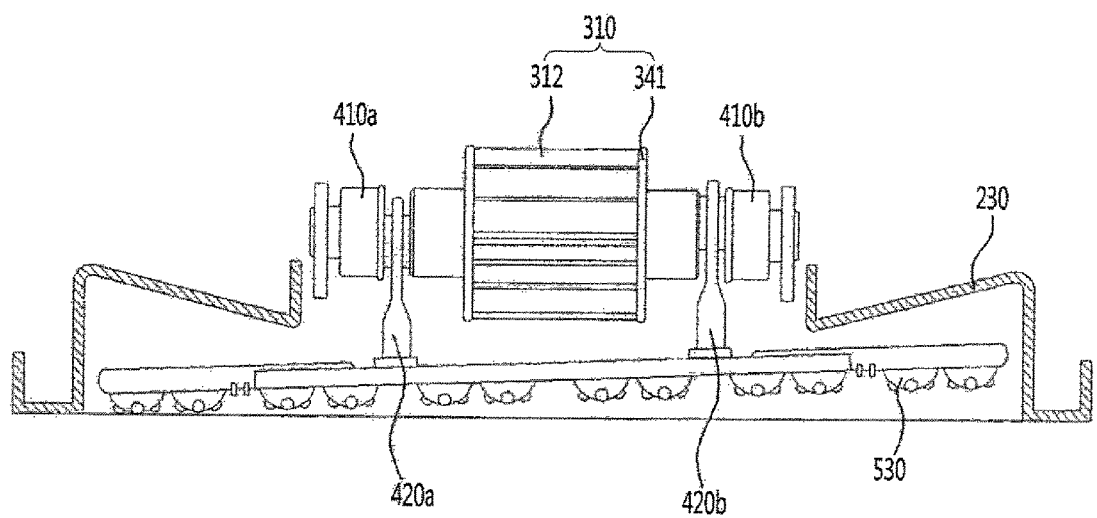

Hereinafter, the striking member 510 will be described in detail. Referring to FIG. 12, an agitator or striking assembly 500 may include the striking member 510, which may perform hitting or striking of the garment. The striking member 510 may also be referred to as a punching member. The striking member 510 may forcibly remove or loosen dust from the garment. Left and right ends of the striking member 510 may alternate to move forward and backward to beat the garment via a rotational or pivot movement based around a center of the striking member 510. Alternatively, the striking member 510 may be configured to simply move forward and backward in its entirety toward and away from the garment to hit the garment. FIGS. 15 and 16 exemplify an alternating movement of the left and right ends of the striking member 510.

The handheld air purifier 2 may include a case 200 forming an outer appearance. The case 200 may include an upper case or shell 202 and a lower case or shell 204 coupled to the upper case 202. The upper and lower cases 202 and 204 may also be referred to as upper and lower frames or as front and back cases, shells, or frames. An interior of the case 200 may include a rotation device or assembly 300, a power transmission device or assembly 400, and the agitator 500.

For convenience of description, reference of orientations and directions will be made with reference to FIG. 12. The front side of the handheld air purifier 2 may be a bottom side in FIG. 12, and the rear side of the handheld air purifier 2 may be an upper side in FIG. 12.

Referring to FIGS. 3 and 12, the agitator 500 may be provided at an outer bottom surface of the lower case 204 (i.e., a front surface that faces the garment) at or adjacent to the suction surface 33. The agitator 500 may be connected to the power transmitting assembly 400 provided inside of the case 200. The case 200 may form the suction body 31. The upper case 202 may be coupled to the connection portion 37 and the handle 32.

Figure 13:
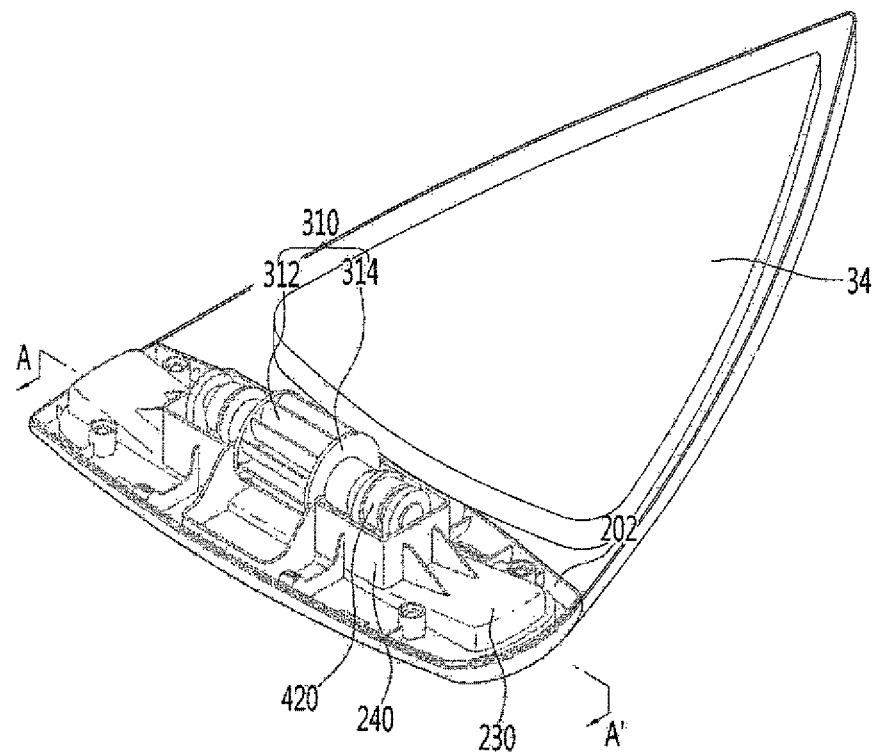
FIG. 13 is a perspective view showing a coupling relationship between a case, a rotation assembly, and a power transmitting assembly.
Figure 14:
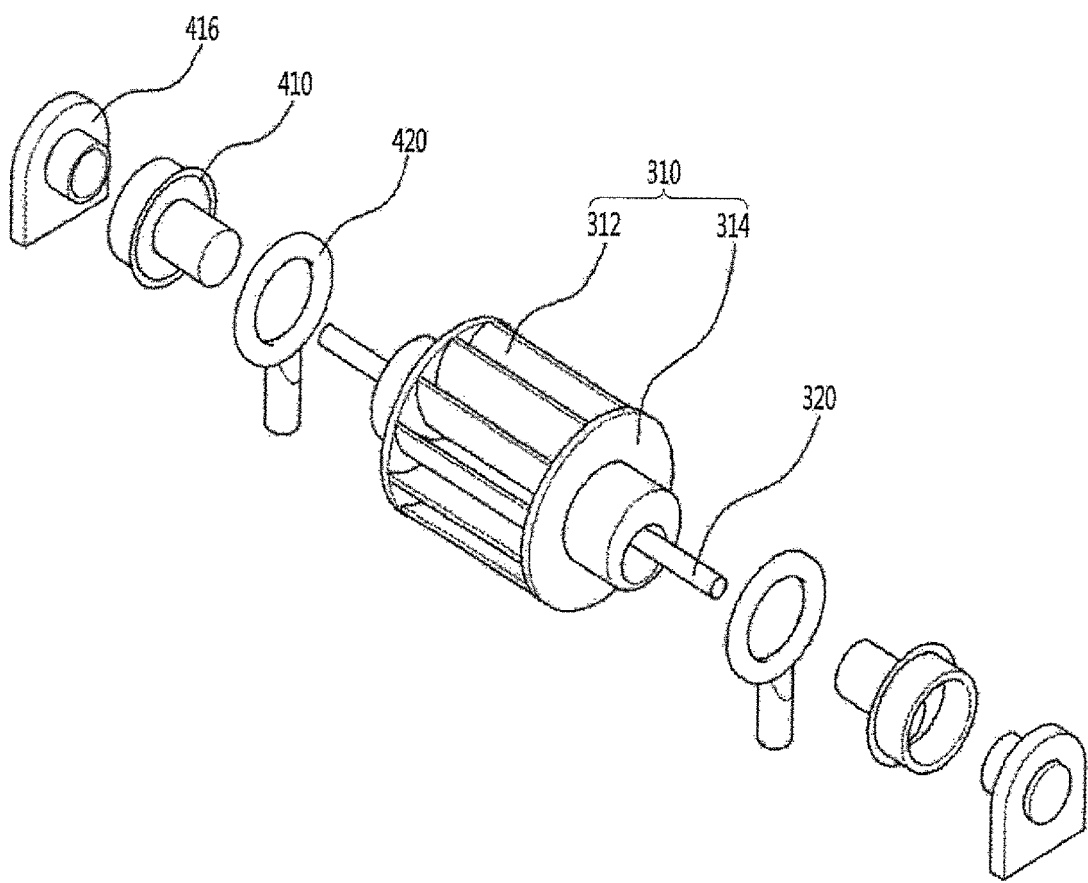
FIG. 14 is an exploded perspective view of a rotating portion and a power transmitting portion.

Referring to FIGS. 3, 12, and 13, an inner frame or separating member 240 to receive and maintain a position of the rotation assembly 300 and the power transmission assembly 400 may be formed on an upper or inner surface of the lower case 204. The inner frame 240 may be provided as a wall having a predetermined shape configured to maintain the rotation assembly 300 and the power transmission assembly 400 in an interior of the case 200.

Dust loosened and shaken off of the garment by the striking member 510 may be suctioned together with air by a suction force of the fan 35 provided inside the handheld air purifier 2. The suction surface 33 may include at least one suction hole formed in the lower case 204 to through which dust and air may be suctioned via the fan 35. An inlet hole or slot 220 may be formed in the upper case 204 through which any errant dust scattered upward or behind the case 200 may be suctioned via the fan 35, and also to introduce air for rotation of the rotation assembly 300. Dust suctioned through the inlet hole 220 and the suction hole may be filtered by the filter 34 so that clean air may be discharged through the discharge port 36.

The suction hole 210 may be formed on the bottom surface of the lower case 204 to suction dust directly from the garment and also from the air surrounding the garment. The inflow hole 220 may be formed on the upper surface of the upper case 202 of the suction body 31 to introduce air used to rotate the rotation assembly 300. Alternatively, the inflow hole 220 may be formed on the lower surface of the lower case 204 to be below the rotation assembly 300. A size and shape of the inflow hole 220 may be configured to increase a speed of air suctioned through the inflow hole 220. Since an inflow speed of the air may increase as a size of the inflow hole 220 decreases, the inflow hole 220 may be formed in a slot or slit shape extending in a lateral direction across the upper case 202 so that the rotation assembly 300 may be efficiently rotated.

The inflow hole 220 may be formed at a position corresponding to the rotation assembly 300 so air suctioned through the inflow hole 220 may be directed to the rotation assembly 300, and an inflow of air may be smooth and unobstructed. For example, the inflow hole 220 may be located above or below a horizontal center of the rotation assembly 300 so that the rotation assembly 300 may rotate in one direction.

The rotation assembly 300 may be rotatably installed inside the case 200 and may be rotated by the air introduced through the inflow hole 220. Alternatively or in addition thereto, the suction hole 210 may be positioned so that the rotation assembly 300 may also be rotated by air introduced through the suction hole 210.

The rotation assembly 300 may includes a fan or turbine 310 (e.g., radial bladed fan, wheel, or mill) having a plurality of blades 312 and a disk member 314 provided at each end of the fan 310. The plurality of blades 312 may extend between the disk members 314 at the ends of the fan 310. A rotation bar 320 may be connected to a rotation axis of the fan 310. Since the rotation bar 320 may serve as a rotation axis of the fan 310, the rotation bar 320 may be coupled and penetrate through the center axis of the fan 310.

The plurality of blades 312 may be arranged at regular intervals along a circumferential direction of the rotation axis of the fan 310. The blades 312 may be curved to have a concave rectangular plate shape and arranged so that air introduced through the inflow hole 220 may collide with a surface of the concave blade 312 in order to increase a rotating performance of the fan 310. The disk member 314 may prevent air introduced through the inflow hole 220 from being discharged laterally of the blade 312 after colliding with the blade 312 so that incoming air may smoothly and efficiently rotate the fan 310.

The power transmission assembly 400 may be provided inside the case unit 200 and coupled to the rotation assembly 300. The power transmission assembly 400 may convert a rotational movement of the rotation assembly 300 into a linear up and down reciprocating movement applied to the striking member 510.

Referring to FIGS. 3 and 14-16, the power transmission assembly 400 may include a camshaft 410 and a cam 420 at each side of the rotation assembly 300. When the fan 310 of the rotation assembly 300 rotates due to air flowing into the inflow hole 220, the camshaft 410 may rotate and the cam 420 may move up and down. A rotational movement of the rotation assembly 300 may be converted into a vertical reciprocating motion via the cam 420 and camshaft 410 of the power transmission assembly 400. A cam 420 may be coupled to each side (e.g., left and right sides) of the striking member 510 of the agitator 500, and the striking member 510 may move forward and backward via a linear movement of the cams 420. When one side (e.g., a left side) of the striking member 510 is moved forward, the other side (e.g., a right side) may be moved backward. Hereinafter, an operation of the agitator 500 will be described in detail.

A cam shaft 410 may be coupled to left and right sides or ends of the rotation assembly 300. A shape and coupling of the camshaft 410 may be configured to eliminate an empty space where blades 312 are not formed, increasing a number of rotations and a rotational force of the fan 310 when air flows through the suction hole 220 and improving performance of the fan 310.

A support member 416 may be coupled to the cam shaft 410 to support the cam shaft 410 and to help stabilize or support the rotation assembly 300. A cam 420 may be provided at left and right sides of the rotation assembly 300 and coupled to the camshaft 410 and the agitator 500. The cam 420 may transmit power or energy received from the fan 310 of the rotation assembly 300 to the agitator 500.

The agitator 500 may press a surface to be treated (e.g., a garment) so that minute dust and other foreign matter existing on the garment may be readily or easily suctioned into the main air purifier 1 or into the handheld air purifier 2. When the agitator 500 repeatedly presses the garment, fine dust and foreign matter existing on the garment may be scattered, and the scattered dust, foreign matter, and other foreign substances may be suctioned into the suction hole 210 formed in the case 200.

The rotation bar 320 may be coupled to a rotation shaft of the fan 310. Both (i.e., left and right) ends of the rotation bar 320 may be coupled to inner sides of first and second (i.e., left and right) cam shafts 410a and 410b, respectively.

Outer sides of the first and second camshafts 410a and 410b may be coupled to the support member 416, which may support the rotation assembly 300 and the power transmission assembly 400. The support member 416 may engage with the first and second camshafts 410a and 410b when the rest of the power transmission assembly 400 and the rotation assembly 300 are mounted in the case 200. The rotation assembly 300 and the power transmission assembly 400 may be fixed within the inner frame 240 formed in the case 200. Ends of the inner frame 240 may be slightly flexible so as to allow insertion of the rotation assembly 300 and power transmission assembly 400, which may together have a total length equal to or slightly longer than a length of the inner frame 240.

Each cam 420 may include an engagement portion or shaft 424 that protrudes downward toward the lower case 204. The lower case 204 may include a hole through which the engagement shaft 424 protrudes to couple to the striking member 510, which may be provided on an outer or lower side of the lower case 204.

A coupling of the first and second cam shafts 410a and 410b with the rotation bar 320 may be configured such that the first and second cam shafts 410a and 410b have a phase difference from each other during rotation of the rotation assembly 300 to allow a back and forth movement or pivoting action of the left and right sides of the striking member 510. As an example, the phase difference may be at or about 180 degrees. Centers of the first camshaft 410a and the second camshaft 410b may be positioned to be opposite to each other, with a rotation axis of the fan 310 at a center between the centers of the first camshaft 410a and the second camshaft 410b. Accordingly, a pivoting or striking distance of the agitator 500 may be maximized.

The first cam shaft 410a may be coupled to a first cam 420a and the second cam shaft 410b may be coupled to a second cam 420b. By providing two cams 420 on both sides of the fan 310a dead or empty space not having any blades 312 may be reduced or eliminated the dead space. Air being suctioned through the inflow hole 220 may be directed toward the blades 312 and may not be directed to a dead space, maximizing an amount of air flow directed to the blades 312 and increasing a rotation of the fan 310, which in turn increases a striking or pivoting frequency of the agitator 500.

Figure 17:
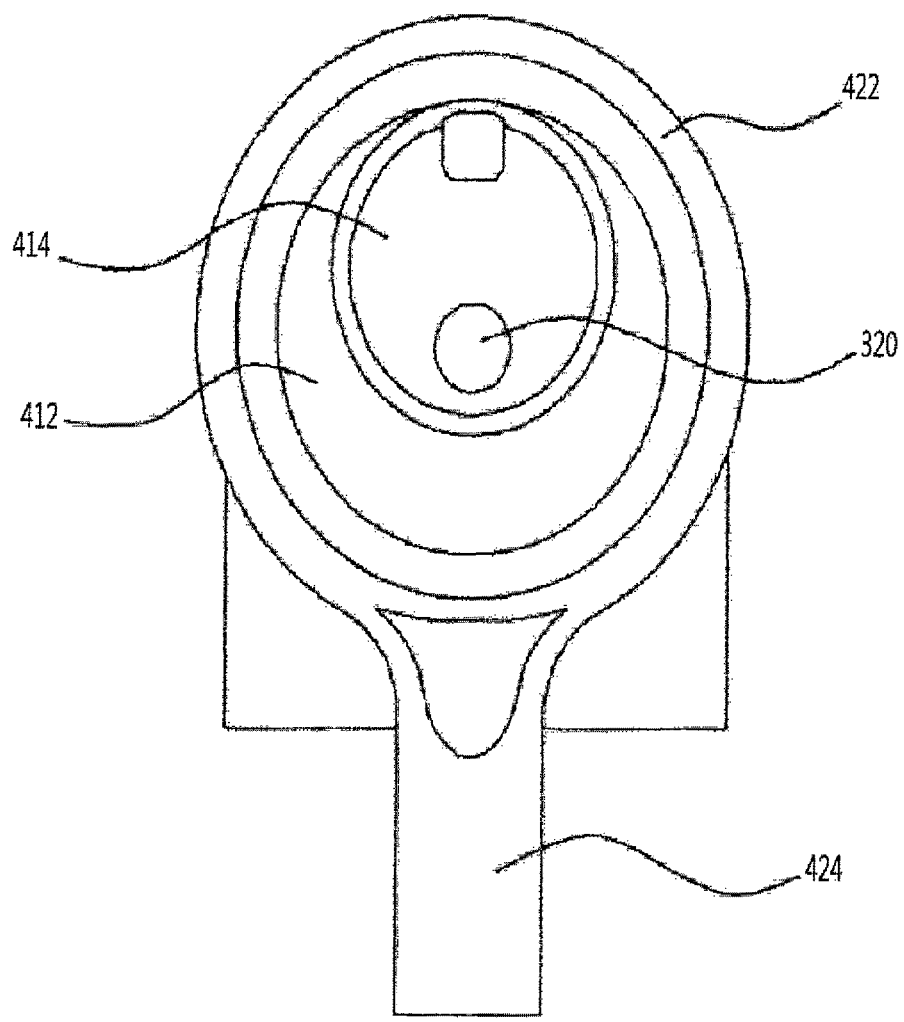
FIG. 17 is a side view showing a camshaft and a cam according to an embodiment.

Referring to FIG. 17, each camshaft 410 may include a fixing member 412, which may be coupled to the support member 416, and a locking member or engagement shaft 414 on which an annular ring or hole 422 of the cam 420 may be fitted. The annular ring 422 may have an elliptical or oval shape. The engagement shaft 424 may extend downward from the annular ring 422. A hole may be formed in between the annular ring 422 of the cam 420 and the engagement shaft 414.

Centers of each camshaft 410 may be spaced apart from the rotation axis of the fan 310 by a predetermined distance, which may cause the agitator to rock and pivot. As an example, the predetermined distance may be ½ of a reciprocating distance of the cam 420. A center of the first camshaft 410a may be spaced apart from the rotation axis of the fan 310 by the predetermined distance, and may be located in an initial state, position, or orientation (e.g., the center of the first camshaft 410a may be the predetermined distance above the rotation axis of the fan 310). An initial state, position, or orientation of the second camshaft 410b may be configured such that the center of the second camshaft 410*b* is spaced apart from the rotation axis of the fan 310 by the predetermined distance so has to may a phase difference of 180 degrees with respect to the center of the first camshaft 410*a* (e.g., the center of the second camshaft 410*b* may be the predetermined distance below the rotation axis of the fan 310.)

The first cam 420*a* may be connected to the engagement shaft 414 of the first camshaft 410*a* and may be coupled to a first side (e.g., left side) of the striking member 510 of the agitator 500. The second cam 420*b* may be connected to the engagement shaft 414 of the second camshaft 410*b* and may be coupled to a second side (e.g., right side) of the striking member 510 of the agitator 500. As shown in FIG. 15, in an initial position, the agitator may be sloped downward from the left side to the right side, as the first cam 420*a* may positioned to be higher than the second cam 420*b*. The right end of the striking member 520 may press against the garment, while the left end of the striking member 520 may be spaced apart from the garment by a reciprocating distance.

When the first camshaft 410*a* and the second camshaft 410*b* rotate 180 degrees, as shown in FIG. 16, positions of the first and second cams 420*a* and 420*b* may be opposite to the initial positions shown in FIG. 15. The second cam 420*b* may be positioned higher than the first cam 420*a*, and the agitator may be sloped upward from the left side to the right side. A center of the first camshaft 410*a* may be spaced below the rotation axis of the fan 310 by the predetermined distance, and a center of the second camshaft 410*a*, which has a phase difference of 180 degrees from the first camshaft 410*a*, may be positioned above the rotation axis of the fan 310 by the predetermined distance. The left end of the striking member 510 may press against the garment, while the right end of the striking member 520 may be spaced apart from the garment by the reciprocating distance.

Due to the phase difference between the first and second camshafts 410*a* and 410*b* being 180 degrees, during one complete rotation of the fan 310, each of the left and right ends of the striking member 510 may press the garment one time for a total of two strikes. If there is no phase difference between the first and second camshafts 410*a* and 410*b*, the left and right ends may together press the garment in one strike during one rotation of the fan 310. A phase difference of 180 degrees has an effect of doubling a hitting effect of the agitator 500 and increasing a hitting speed, which may better loosen dust from the garment. A bottom surface of the striking member 510 may have optional protrusions or curved protuberances 530 to beat a surface of the garment.

Figure 18:
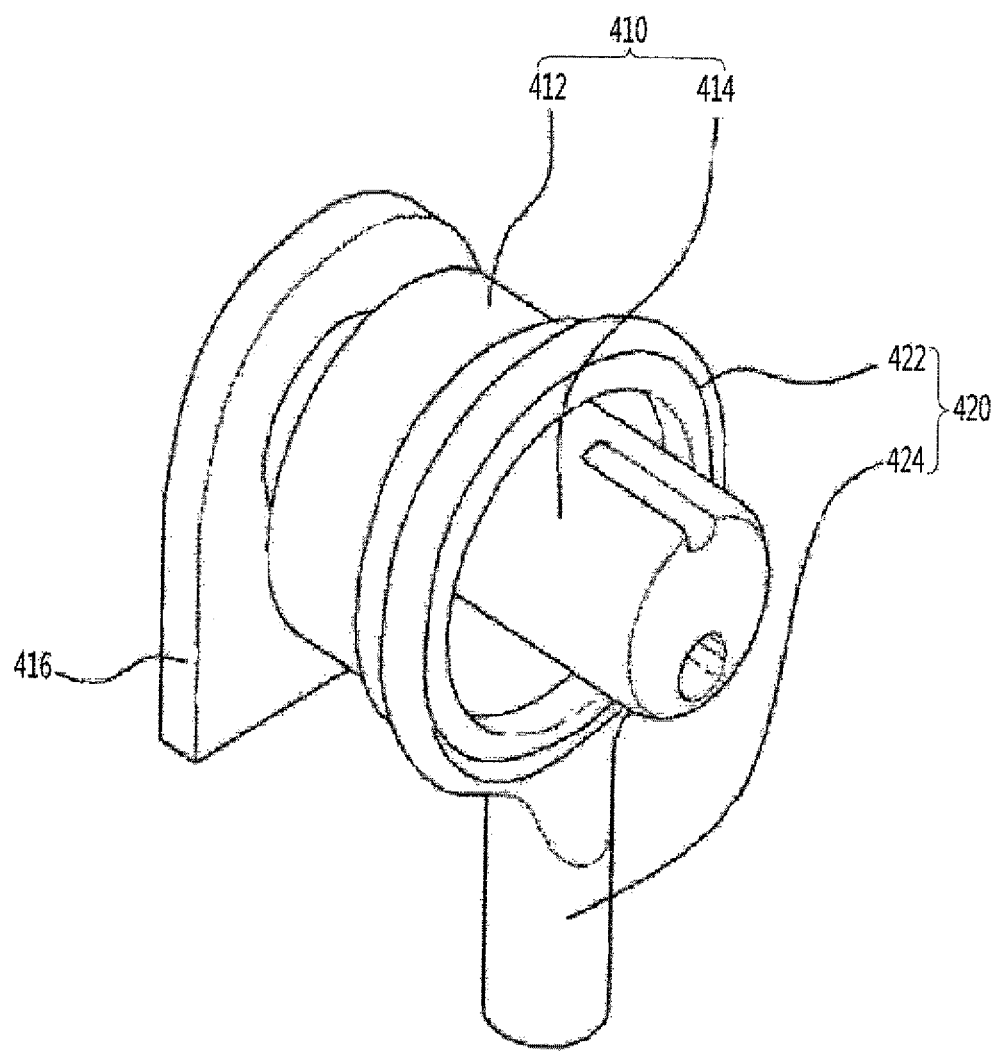
FIG. 18 is a perspective view showing the camshaft and the cam according to an embodiment.

Referring to FIGS. 17 to 18, the engagement shaft 414 of the camshaft 410 may be connected, by a loose fit, to the cam 420 by being inserted into the annular ring 422 of the cam 420. The annular ring 422 of the cam 420 may be slid with respect to the engagement shaft 414 of the camshaft 410 during operation so that the camshaft 410 contacts the cam 420 and noise is reduced.

The engagement shaft 414 of the camshaft 410 may have a cylindrical shape protruding from the fixing member 412 of the camshaft 410. However, a shape of the engagement shaft 414 may be not limited, and may alternatively have, for example, an elliptical shape.

Figure 19:
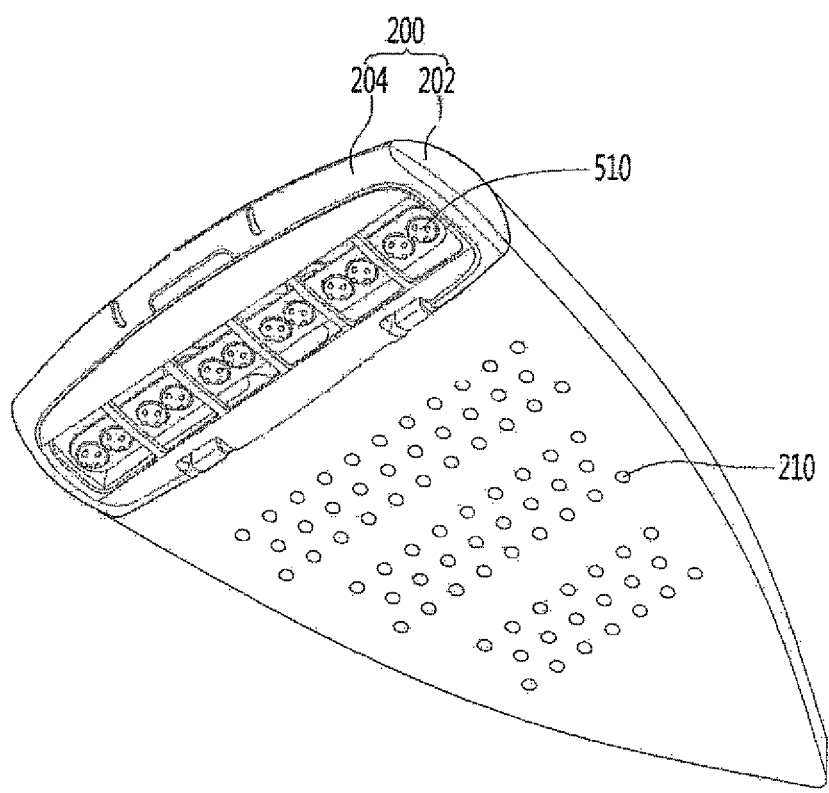
FIG. 19 is a perspective view of the handheld air purifier according to an embodiment.

Referring to FIGS. 12 and 19, the agitator 500 may repeatedly press a surface to be cleaned (e.g., garment). The agitator 500 may function to separate and scatter dust and other foreign matter from the garment by striking the garment. The suction hole 210 of the case 200 may easily suction the scattered dust The agitator 500 may include a striking member 510 to repeatedly press the garment and a noise reducing member 520 provided at left and right ends of the striking member 510 to reduce noise during striking. The striking member 510 may be a rectangular plate, and each corner may be rounded to prevent the garment, which may be made of fabric, from being torn by the striking member 510. An insertion hole or recess configured to receive the engagement shaft 424 of the cam 420 may be formed on an upper surface of the striking member 510. A penetrating member or frame 250 may surround the hole or recess. The penetrating member 250 may be provided on a lower surface of the lower case 250. The engagement shaft 424 may couple the agitator 500 to the power transmission assembly 400.

The noise reducing member 520 may prevent or reduce noise generated when the agitator 500 presses the garment. The noise reducing member 520 may be formed of an elastic or soft material (e.g., rubber, cushion, or foam).

Corner portions of the striking member 510 may be rounded, as described above, and ends of the noise reducing member 520 may have a rounded shape corresponding to the respective corner portions of the striking member 510.

Since each of the left and right ends of the striking member 510 may hit the garment, a noise reducing member 520 may be provided at both left and right ends. At least one protrusion 530 may protrude downward from the striking member 510 and the noise reducing member 520 to facilitate contact with the garment. There may be a plurality of protrusions 530 along the entire striking member 510. In addition, a plurality of smaller protrusions or bumps may protrude from the protrusion 530 to increase a scattering effect.

Referring to FIGS. 12, 13, 15, 16, and 19, a cavity 230 may be formed on a bottom surface of the lower case 204 to leave a space allowing a back and forth or pivoting movement of the striking member 510. The cavity 230 may reduce or prevent collision between the striking member 410 and the case 200 during movement, and so may reduce noise. The cavity 230 may be formed by recessing the bottom surface of the lower case 204 upward to avoid the striking member 510.

As described above, in the initial state of operation, the left and right ends of the agitator 500 may alternate moving forward and backward via the first and second cams 420*a* and 420*b*, which may move forward and backward via rotation of the first and second camshafts 410*a* and 410*b*. When the fan 310 makes one rotation, the agitator 500 may perform a rocking motion. The cavity 230 may be inclined upward from a center of the case 200 toward left and right sides in the longitudinal direction.

The engagement shaft 424 of the cam 420 may couple to the agitator 500 by penetrating the lower case 204, the penetrating member 250, and the striking member 510. The penetrating member 250 may support the engagement shaft 424 to reduce or prevent the engagement shaft 424 of the cam 420 from colliding with the through hole formed in the lower case 204, and may also reduce noise from any such collision.

Figure 20:
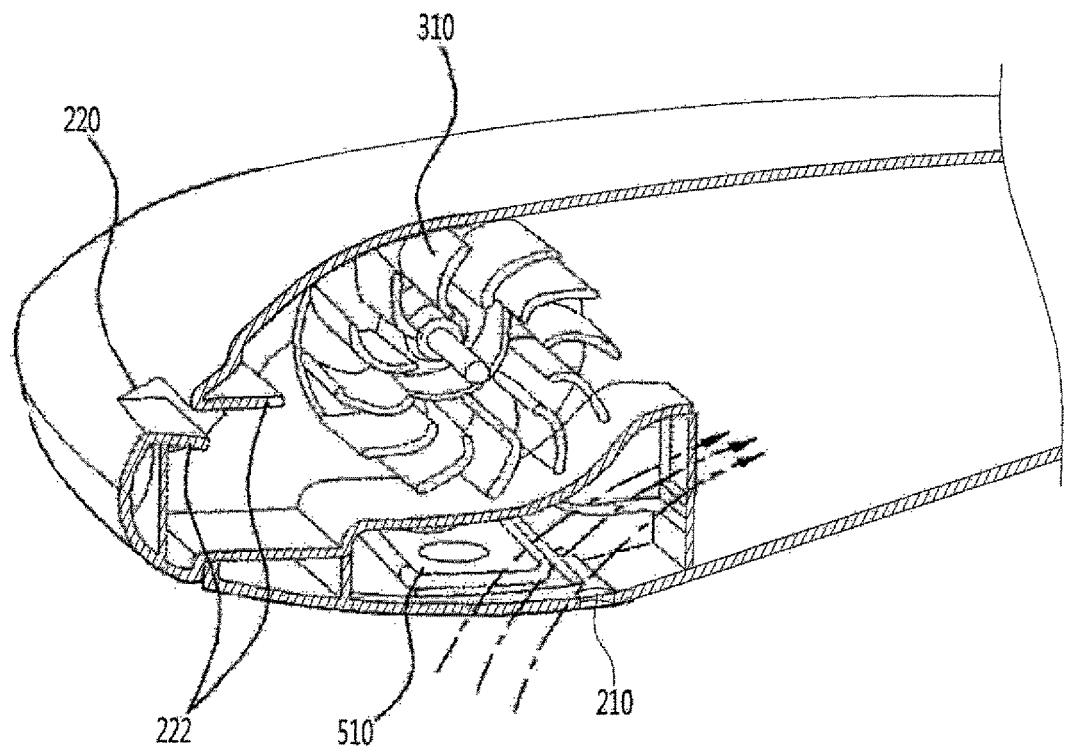
FIG. 20 is a side cross-sectional view showing a suction side of the handheld air purifier according to an embodiment.

Referring to FIGS. 12 and 20, the handheld air purifier 2 may suction air containing dust and foreign matter by a suction force of the fan 35 mounted inside the case 200. Air may be suctioned through the suction surface 33, the suction hole 210, and the inflow hole 220.

The suction hole 210 may be provided on the bottom surface of the lower case 204 adjacent to the agitator 500 (e.g., at a side of the striking member 510) to suction dust scattered from the agitator 500. Of course, the suction surface 33 does not suction scattered dust. The inflow hole 220 may be formed in an upper surface of the upper case 202 at a position aligning with the fan 310 to introduce air to rotate the rotation assembly 300.

As previously described, the inflow hole 220 may be formed in a slot shape in a lateral direction on the case 200 such that air suctioned through the inflow hole 220 may have a relatively high inflow speed and so that the rotation of the rotation assembly 300 may be efficiently performed. The inflow hole 220 may face a mounting position of the fan 310 so that air may be smoothly introduced to rotate the fan 310.

Guide ribs or walls 222 to guide the inflow of air suctioned into the inflow hole 220 may be formed in an interior of the upper case 202. The guide ribs 222 may extend from upper and lower sides of the inflow hole 220 toward the fan 310. As shown in FIG. 20, the inflow hole 220 may be formed on a curved or inclined portion of the upper case 202, and the guide ribs 222 may be horizontal or slightly inclined downward toward the fan 310:

Dust loosened or scattered from a garment may be suctioned through the suction hole 210 and also through the inflow hole 220 to reduce an amount of dust scattered to the rest of the indoor space. As shown in FIG. 20, dust suctioned through the suction hole 210 may flow toward the filter 34 to be filtered and so that clean air may be discharged.

Figure 21:
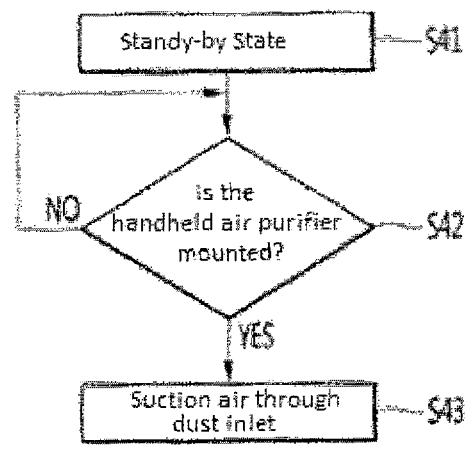
FIG. 21 is a flowchart illustrating a control method of an air purifying system according to another embodiment.

Referring to FIGS. 6 and 21, the main air purifier 1 and the handheld air purifier 2 may be controlled based on whether the handheld air purifier 2 is mounted on the main air purifier 2. The main air purifier 1 may be in a standby state S41. The seating sensor 63 may periodically sense whether the handheld air purifier 2 is mounted on the main air purifier 1 S42. If the seating sensor 63 does not sense that the handheld air purifier 2 is mounted ("NO"), then the main air purifier 1 may continue to operate in a standby state. If the seating sensor 63 senses ("YES") that the handheld air purifier 2 is mounted on the mounting portion 15, then the main air purifier 1 may operate to suction air through the dust inlet 64, which may be adjacent to the handheld air purifier 2 S43.

When the handheld air purifier 2 is mounted after being detached, it is possible that the handheld air purifier 2 has been used at least once, and many foreign objects may be attached thereto. During S43, The main air purifier 1 may be operated to suction air from the suction surface 33 of the handheld air purifier 2 through the dust inlet 64 and the inlet connection conduit 1121 to remove foreign substances from the handheld air purifier 2. The handheld air purifier 2 may be maintained in a clean state, improving user satisfaction, convenience, and durability and use life of the handheld air purifier 2.

This application is related to co-pending U.S. application Ser. No. 16/821,087 filed on Mar. 17, 2020 and Ser. No. 16/821,197 filed on Mar. 17, 2020, the entire contents of which are hereby incorporated by reference.

Embodiments disclosed herein may provide an air cleaning or purifying system having a main air cleaner or purifier in a fixed position and a movable body or handheld air cleaner or purifier which is freely attachable to the main air cleaner and is freely applicable to clothes. Not only may the two devices be used individually, but dust cleaning of clothes can be performed with higher efficiency by mutual cooperation of the two devices, so that industrial application may be highly expected. Embodiments disclosed herein may provide an air purifying system where dust on clothes may be removed more effectively. It will be apparent to those skilled in the art that various modifications and variations can be made without departing from the spirit or scope of the disclosure.

Embodiments disclosed herein may be provide a an air cleaner or purifier, an air cleaning or purifying system, and a method of controlling an air cleaner or purifier or air cleaning or purifying system which may prevent scattering of dust removed from clothing, thereby reducing indoor pollution.

Embodiments disclosed herein may provide an air purifier or cleaner, an air cleaning or purifying system, and a control method of an air purifying system that may reduce fugitive or errant dust breathed in by a user when the user removes foreign matter from clothing.

Embodiments disclosed herein may provide an air purifier, an air cleaning or purifying system, and a control method of an air cleaning or purifying system that may effectively remove foreign matter or dust attached to clothing.

Embodiments disclosed herein may provide an air purifier, an air cleaning or purifying system, and a control method of an air purifying system that may reduce energy consumption.

Embodiments disclosed herein may be implemented as an air purifier including an inhaler or suction member or body provided with a fan or blower and a filter to suck or suction outside air and to filter foreign matter, a handle extending from the suction body, and a striking, hitting, punching, or beating device or member provided in the suction body to release foreign matter from a surface to be treated (e.g., clothes) by swinging the striking member, which may be exposed to an outside through a lower or bottom surface of the suction body. Foreign matter, dust, etc. on clothes may be easily removed or loosened by the striking member and a fan suctioning air through the suction body working together.

The striking member may be rotated by air suctioned into the suction body, and a separate power transmission mechanism may not be necessary, improving convenience. The lower surface of the suction body may have a triangular shape so that dust or foreign matter at all corners or edges of clothes may be loosened and suctioned. The lower surface of the suction body may have two vertexes or vertices at an outer end and one vertex at an inner end to clean corners of the clothes corresponding to the vertices.

An angle of the two vertexes at the outer end may be set to be larger than an angle of the one vertex at the inner end so that the suction body may reach anywhere in or on the clothes and the user may more conveniently operate the air purifier. For example, two ends of the suction body may be farthest out of reach. The angle of the two vertexes at the outer end and the angle of one vertex at the inner end may all be smaller than 90 degrees so that the air purifier may reach an inside corner of a garment.

The suction body may suction air through an upper surface and a lower surface, and may perform a function of suctioning and providing rotation power within the suction body. A central axis of the handle may be positioned above the center axis of the suction body so that a user's hand does not touch foreign matter on the clothes.

Embodiments disclosed herein may be implemented as an air cleaning or purifying system comprising a main air purifier for performing a large-capacity air cleaning or purifying operation and a moving body or handheld air purifier which is smaller in size and smaller in air cleaning capacity than the main air cleaner. The handheld air purifier may also be referred to as a movable or portable air purifier.

The handheld air purifier may be easily mounted on and separated from the main air purifier and may be used to clean or treat surfaces (e.g., clothes, garments, sheets, towels, etc.) when separated from the main air purifier.

The handheld air purifier may include a suction body having a filter and a handle connected to the suction body. The handheld air purifier may be mounted on the main air purifier such that a suction surface of the suction body through which foreign matter may be suctioned faces or is aligned with a suction surface of the main air purifier. When the handheld air purifier is mounted on the main air purifier, the suction surface of the handheld air purifier may be cleaned by the main air purifier. Further, the suction surface of the handheld air purifier may be sterilized (via, e.g., an ultraviolet light provided on the main air purifier).

The main air purifier may have a plurality of holes or openings provided on an outer surface corresponding to a suction side. The main air purifier may suction foreign matter on the suction side or suction surface of the handheld air purifier through a dust suction port.

Negative pressure of the main air purifier may be applied to the dust suction port so that the suction body of the handheld air purifier may be cleaned without a separate driving source. The dust suction port may be provided on the handheld air purifier. A suction port connecting pipe may connect the dust suction port and the suction surface of the main air purifier so that negative pressure from the suction surface of the main air purifier may reach the handheld air cleaner. When the handheld air purifier is mounted on the main air purifier, the handle may be directed downward to facilitate a mounting of a large-volume suction body.

A seating sensor to sense a seating or mounting of the handheld air purifier may be included to recognize a mounting of the handheld air purifier and to interlock the main air purifier with the handheld air cleaner. The main air purifier and the handheld air purifier may communicate with each other so that an interlocking operation between the main air purifier and the handheld air purifier may be continuously performed.

A striking member may be exposed to an outside from a lower surface of the suction body to strike clothes. The handheld air purifier may be used for the purpose of removing dust on surfaces or fabrics such as clothes and other textile products.

A rotating unit or assembly may have a plurality of blades to interlock with the striking member, which may not require a separate driving source (e.g., a motor). The rotating assembly may be rotatable by air introduced into the suction body so that a blade may be operated by wind or air which flows from the outside.

Embodiments disclosed herein may be implemented as a method of controlling an air cleaning or purifying system including a main air purifier for performing a large-capacity air purifying function and a handheld air purifier capable of being attached to and detached from the main air purifier. An operation state of the main air purifier may be changed via a signal indicating that the handheld air purifier may be installed, seated, or mounted. An interaction between the main air purifier and the handheld air purifier may be brought out to enable a more efficient air cleaning or purifying operation. When the handheld air purifier is mounted, the main air purifier may operate to remove foreign matter from the handheld air purifier so that the handheld air purifier may be maintained in a clean state.

Embodiments disclosed herein may remove dust from garments, clothes, sheets, etc. in a manner that suctions dust, pollutants, or other foreign matter, thereby reducing an amount of dust scattering and removing dust in multiple stages to reduce dust scattering into the room. Since the dust present on clothes may be removed by the suction method using the handheld purifier, an amount of foreign matter breathed in by or scattered into the mouth of the user may be reduced, and the dust scattered in the air may be suctioned and removed again by the main purifier. As a result, an amount of dust that may be unintentionally breathed in or swallowed may be further reduced.

An operation of the handheld purifier and an operation of the main purifier may be synchronized, thereby reducing unnecessary energy use. Embodiments disclosed herein may completely remove dust attached to the clothes after going out because the dust of the clothes may be removed by being shaken off and then suctioned.

Embodiments disclosed herein may be implemented as an air purifier comprising a case having a lower surface, a plurality of openings provided on a first area of the lower surface of the case, a handle extending from the case, a fan provided inside the case and configured to suction air through at least one inlet and discharge air through an outlet, the at least one inlet including the plurality of openings, a filter provided in the case and adjacent to the first area, and an agitator exposed through the lower surface of the case. The agitator may be configured to move out of and into the case to strike a surface provided below the case. The agitator may be pivoted by air suctioned into the case.

The lower surface of the case may have a triangular shape. The lower surface of the case may have one vertex at a first side of the case from which the handle extends. The lower surface of the case may have two vertices at a second side of the case opposite the first side.

An angle of the two vertices at the second side may be larger than an angle of the vertex at the first side. The angles of the vertices at the first and second sides may be less than 90 degrees.

The at least one inlet may include an inlet hole provided on an upper surface of the case. A center axis of the handle extending along a longitudinal direction may be configured to be above a center axis of the case extending along the longitudinal direction.

Embodiments disclosed herein may be implemented as an air purifying system comprising a main air purifier configured to purify air, and a handheld air purifier configured to purify air at a smaller air purifying capacity than the main air purifier and configured to be mounted on and removed from the main air purifier. The handheld air purifier may include a suction body having a first surface and a filter, and a handle coupled to the suction body. When the handheld air purifier is mounted on the main air purifier, the main air purifier may perform at least one of suctioning foreign matter from the first surface or sterilizing the first surface.

The main air purifier may include a mounting portion configured to receive the handheld air purifier, a dust inlet having a plurality of holes provided on an outer surface of the mounting portion such that, when the handheld air purifier is mounted on the main air purifier, the first surface is aligned with the dust inlet, and a fan to suction air through the dust inlet. The main air purifier may further include a suction portion provided at a bottom and an inlet connection conduit connecting the dust inlet and the suction portion.

The main air purifier may include a mounting portion configured to receive the handheld air purifier, and an ultraviolet light emitting diode provided in the mounting portion and configured to emit ultraviolet light on the first surface when the handheld air purifier is mounted on the main air purifier to sterilize the first surface.

The main air purifier may include a sensor to sense whether the handheld air purifier is mounted on the main air purifier. The main air purifier and the handheld air purifier may wirelessly communicate with each other.

The handheld air purifier may include a striking bar provided at a lower surface of the suction body. The striking bar may be configured to move forward from the suction body and backward toward the suction body to strike a surface.

The suction body may include a rotating assembly having a turbine. The striking member may be configured to move when the turbine rotates. The turbine may have a plurality of blades configured to rotate when air is suctioned into the suction body.

The suction body may include a power transmitting assembly to convert a rotation movement of the turbine to a linear movement of first and second ends of the striking member. The first and second ends may be configured to alternate pivoting back and forth when the turbine rotates.

Embodiments disclosed herein may be implemented as an air purifying system comprising a main air purifier configured to suction ambient air, purify the suctioned air, and discharge the purified air, and a handheld air purifier configured to be seated on and lifted from the main air purifier. The handheld air purifier may be configured to suction a lesser volume of air than the main air purifier, purify the suctioned air, and discharged the purified air. An operation of the main air purifier may be based on whether the handheld air purifier is seated on the main air purifier. When the handheld air purifier is seated on the main air purifier, the main air purifier may be operated to remove foreign matter from the handheld air purifier.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifier, comprising:
a case having a lower surface;
a plurality of openings provided on a first area of the lower surface of the case;
a handle extending from the case;
a fan provided inside the case and configured to suction air through at least one inlet and discharge air through an outlet, the at least one inlet including the plurality of openings;
a filter provided in the case and adjacent to the first area; and an agitator exposed through the lower surface of the case, wherein the agitator is configured to move out of and into the case to strike a surface provided below the case.

2. The air purifier of claim 1, wherein the agitator is pivoted by air suctioned into the case.

3. The air purifier of claim 1, wherein the lower surface of the case has a triangular shape.

4. The air purifier of claim 3, wherein the lower surface of the case has one vertex at a first side of the case from which the handle extends, and the lower surface of the case has two vertices at a second side of the case opposite the first side.

5. The air purifier of claim 4, wherein an angle of the two vertices at the second side is larger than an angle of the vertex at the first side.

6. The air purifier of claim 5, wherein the angles of the vertices at the first and second sides are less than 90 degrees.

7. The air purifier of claim 1, wherein the at least one inlet includes an inlet hole provided on an upper surface of the case.

8. The air purifier of claim 1, wherein a center axis of the handle extending along a longitudinal direction is configured to be above a center axis of the case extending along the longitudinal direction.

9. An air purifying system, comprising:
a main air purifier configured to purify air; and
a handheld air purifier configured to purify air at a smaller air purifying capacity than the main air purifier and configured to be mounted on and removed from the main air purifier, the handheld air purifier including:
a suction body having a first surface and a filter, and
a handle coupled to the suction body, wherein, when the handheld air purifier is mounted on the main air purifier, the main air purifier performs at least one of suctioning foreign matter from the first surface or sterilizing the first surface,
wherein the handheld air purifier includes a striking bar provided at a lower surface of the suction body, the striking bar being configured to move forward from the suction body and backward toward the suction body to strike a surface.

10. The air purifying system of claim 9, wherein the main air purifier includes:
a mounting portion configured to receive the handheld air purifier;
a dust inlet having a plurality of holes provided on an outer surface of the mounting portion such that, when the handheld air purifier is mounted on the main air purifier, the first surface is aligned with the dust inlet; and
a fan to suction air through the dust inlet.

11. The air purifying system of claim 10, wherein the main air purifier further includes a suction portion provided at a bottom and an inlet connection conduit connecting the dust inlet and the suction portion.

12. The air purifying system of claim 9, wherein the main air purifier includes:
a mounting portion configured to receive the handheld air purifier; and
an ultraviolet light emitting diode provided in the mounting portion and configured to emit ultraviolet light on the first surface when the handheld air purifier is mounted on the main air purifier to sterilize the first surface.

13. The air purifying system of claim 9, wherein the main air purifier includes a sensor to sense whether the handheld air purifier is mounted on the main air purifier.

14. The air purifying system of claim 9, wherein the main air purifier and the handheld air purifier wirelessly communicate with each other.

15. The air purifying system of claim 9, wherein the suction body includes a rotating assembly having a turbine, and the striking member is configured to move when the turbine rotates.

16. The air purifying system of claim 15, wherein the turbine has a plurality of blades configured to rotate when air is suctioned into the suction body.

17. The air purifying system of claim 15, wherein the suction body includes a power transmitting assembly to convert a rotation movement of the turbine to a linear movement of first and second ends of the striking member, the first and second ends being configured to alternate pivoting back and forth when the turbine rotates.

18. An air purifying system, comprising:
a main air purifier configured to suction ambient air, purify the suctioned air, and discharge the purified air, the main air purifier having a first motor, a first fan, and a first filter; and
a handheld air purifier configured to be seated on and lifted from the main air purifier, the handheld air purifier being configured to suction a lesser volume of air than the main air purifier, purify the suctioned air, and discharged the purified air, and the handheld air purifier having a second motor different from the first motor, a second fan different from the first fan and a second filter different from the first filter,
wherein an operation of the main air purifier is based on whether the handheld air purifier is seated on the main air purifier.

19. The air purifying system of claim 18, wherein when the handheld air purifier is seated on the main air purifier, the main air purifier is operated to remove foreign matter from the handheld air purifier.

* * * * *